United States Patent
Legbedji et al.

(10) Patent No.: US 9,336,338 B2
(45) Date of Patent: May 10, 2016

(54) GLOBAL SOLUTIONS OF SMART BUILDING-GRID ENERGY MANAGEMENT MODELS

(71) Applicants: Motto Alexis Legbedji, Princeton, NJ (US); Yu Sun, Plainsboro, NJ (US); Amit Chakraborty, East Windsor, NJ (US)

(72) Inventors: Motto Alexis Legbedji, Princeton, NJ (US); Yu Sun, Plainsboro, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 13/760,420

(22) Filed: Feb. 6, 2013

(65) Prior Publication Data

US 2013/0238294 A1     Sep. 12, 2013

Related U.S. Application Data

(60) Provisional application No. 61/612,570, filed on Mar. 19, 2012, provisional application No. 61/607,795, filed on Mar. 7, 2012.

(51) Int. Cl.
| | |
|---|---|
| *G06F 7/60* | (2006.01) |
| *G06F 17/10* | (2006.01) |
| *G06F 17/50* | (2006.01) |
| *G06Q 50/06* | (2012.01) |

(52) U.S. Cl.
CPC ............ *G06F 17/5004* (2013.01); *G06Q 50/06* (2013.01); *G06F 2217/78* (2013.01); *Y02E 60/76* (2013.01); *Y04S 40/22* (2013.01)

(58) Field of Classification Search
CPC ............ G06F 17/5018; G06F 17/5036; G06F 17/5009; G06F 2217/16; G05B 17/02
USPC ............................................................ 703/2
See application file for complete search history.

(56) References Cited

U.S. PATENT DOCUMENTS

2013/0085614 A1*   4/2013   Wenzel et al. ................ 700/277

OTHER PUBLICATIONS

Vikas Chandan, et al., "Modeling and Optimization of a Combined Cooling, Heating and Power Plant System," Proc. American Control Conference, 2012.

* cited by examiner

*Primary Examiner* — Saif Alhija

(57) ABSTRACT

According to an aspect of the invention, there is provided a method for optimizing a cost of electric power generation in a smart site energy management model, including providing a cost function that models a smart building-grid energy system of a plurality of buildings on a site interconnected with electric power grid energy resources and constraints due to a building model, an electric grid model, and a building-grid interface model, where decision variables for each of the building model, the electric grid model, and the building-grid interface model are box-constrained, and minimizing the cost function subject to the building model constraints, the electric grid model constraints, and building-grid interface model constraints.

22 Claims, 4 Drawing Sheets

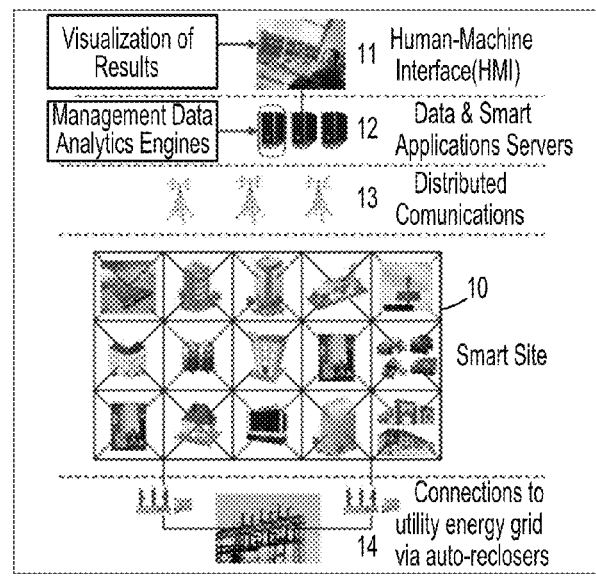
FIG. 1. Smart Site energy management architecture diagram
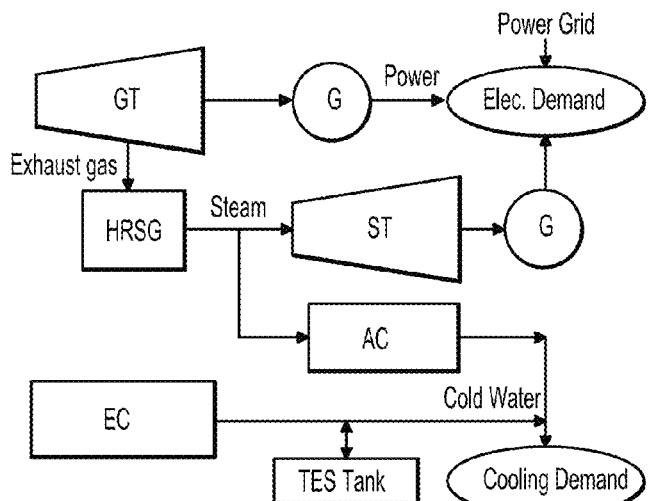
FIG. 2. A typical CCHP system
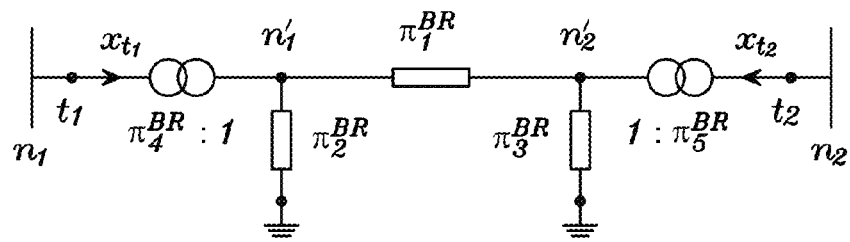
FIG. 3. Unified branch model

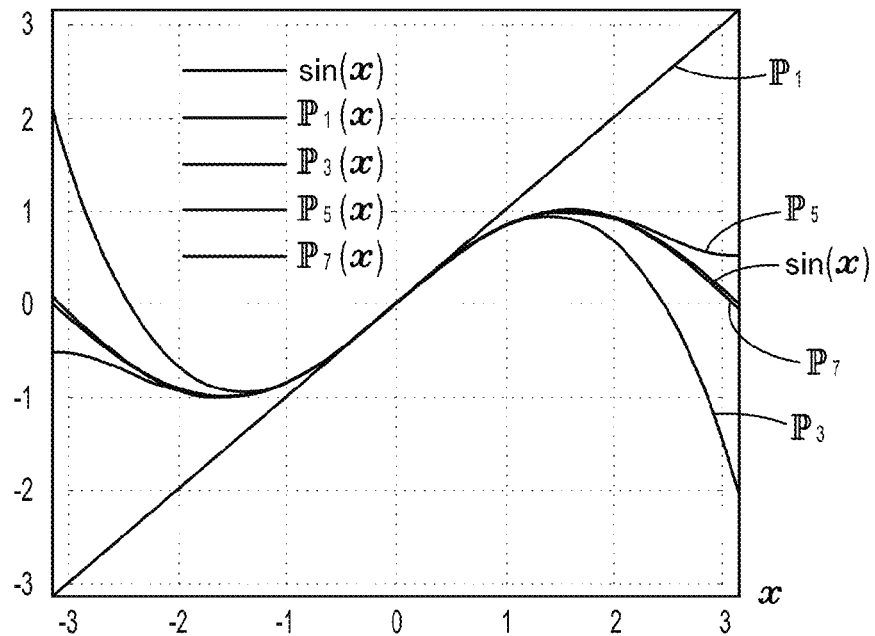
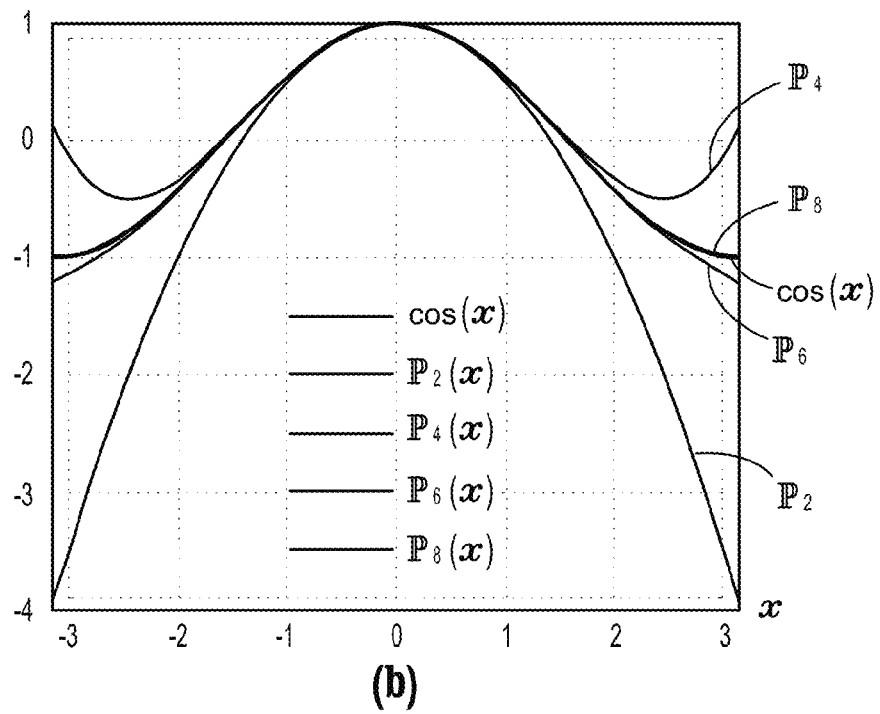
FIG. 4

GLOBAL SOLUTIONS OF SMART BUILDING-GRID ENERGY MANAGEMENT MODELS

CROSS REFERENCE TO RELATED UNITED STATES APPLICATIONS

This application claims priority from "On Solution of a Class of Smart Building-Grid Energy Management Models", U.S. Provisional Application No. 61/612,570 of Motto, et al., filed Mar. 19, 2012, and "On Solution of a Class of Smart Building-Grid Energy Management Models", U.S. Provisional Application No. 61/607,795 of Motto, et al., filed Mar. 7, 2012, the contents of both of which are herein incorporated by reference in their entireties.

TECHNICAL FIELD

This disclosure is directed to methods for convex relaxation of a class of smart building-grid energy management models using a semidefinite programming approach.

DISCUSSION OF THE RELATED ART

A smart building-grid energy system is roughly defined as an interconnection of buildings and electric power grid energy resources within a clearly defined boundary, herein below called a smart site. A smart site is a strategic or self-interested entity that seeks to maximize some utility function subject to all applicable technical and budget constraints. The utility function is a measure of energy efficiency. A smart site may purchase energy from or sell energy to its external environment. On one hand, traditional building energy management systems have focused on meeting the energy requirements of one or more buildings assuming that the buildings are connected to a strong or infinite-capacity utility grid. On the other hand, electric grid management systems have traditionally modeled relatively large sites as single grid nodes with simple lump load models.

Modeling and solving the coordinated self-interested building and electric grid management models can help improve energy efficiency and security. From a practical perspective, global solutions to a general class of mathematical optimizations are of interest. Such optimization problems usually feature nonlinear constraints and many local minima. In most current works, local solutions are obtained using heuristic procedures.

From algorithmic perspective, the field of semidefinite programming (SDP) has received much interest in mathematical optimization in the last decade. SDP has applications in such diverse fields as traditional convex constrained optimization, control theory, and combinatorial optimization. Because SDPs are solvable via interior-point methods, and usually require about the same amount of computational resources as linear optimization, most applications can usually be efficiently solved in practice as well as in theory. There is interest in obtaining tight SDP relaxations of the building-grid energy management optimization and possibly exploiting the sparsity structure of the system.

Optimization in building energy management system has been much studied. The objective is to meet the thermal and/or electricity demand in the facility while minimizing a cost function that is a measure of, e.g., electricity cost, fuel cost, energy losses, etc. Reference V. Chandan, et al., "Modeling and Optimization of a Combined Cooling, Heating and Power Plant System," in *Proc. American Control Conference*, 2012, the contents of which are herein incorporated by reference in their entirety, presents a building energy management model that is a special case of a smart site, specifically a given university campus, and obtained best local solutions using a heuristic procedure. Moreover, the above methods neither seek a global minimum, nor provide a mechanism to measure the gap between the found local minimum and a potential global minimum.

SUMMARY

Exemplary embodiments of the invention as described herein generally include coordinated building and energy management models, and a convex relaxation of the ensuing nonlinear, nonconvex model using an interior point method that exploits the sparsity of the model structure for which a solution yields a tight lower bound. A method according to an embodiment of the invention is potentially large-scale and provides a means to test whether any solution is global, within engineering tolerance, and the corresponding optimality gap. A coordinated building and grid energy management model according to an embodiment of the invention has increased energy efficiency potential because a coordinated strategy dominates (weakly or strongly) an uncoordinated strategy, a well-known result in strategic game theory, and increased energy security potential because a model according to an embodiment of the invention does not assume an infinite-capacity grid, but rather includes grid operational and security constraints. Hence a feasible solution to a model according to an embodiment of the invention may not violate electric grid operation and security requirements.

According to an aspect of the invention, there is provided a method for optimizing a cost of electric power generation in a smart site energy management model, including providing a cost function $\zeta$ that models a smart building-grid energy system of a plurality of buildings on a site interconnected with electric power grid energy resources and constraints due to a building model, an electric grid model, and a building-grid interface model, where decision variables for each of the building model, the electric grid model, and the building-grid interface model are box-constrained; and minimizing the cost function subject to the building model constraints, the electric grid model constraints, and building-grid interface model constraints, where the building model includes a plurality of buildings, one or more gas turbines and generators as on-site sources for electricity power, electric chillers, pumps and thermal energy storage tanks, where waste heat in exhaust gas from the gas turbines is used to generate steam in one or more heat recovery steam generator (HRSG) units, steam from the HRSG units drives one or more absorption chillers to generate cooling, one or more steam turbines to drive additional electricity generators, or provides heating needs for the plurality of buildings, the electric grid includes one or more loads and is modeled as an undirected graph $G=(N, E)$, where N and E denote sets of electric nodes and branches, respectively, where each branch has an origin terminal and a destination terminal, each terminal is connected to an electric node, a voltage at node $n_1$ is a complex number defined by its magnitude and angle, and a power flow at terminal $t_1$ is a complex number defined by its real and imaginary parts, and the building-grid interface model constrains a building cooling load to be satisfied by chiller operations at all times, and an electricity load to be satisfied by on-site generation and the electric grid.

According to a further aspect of the invention, the cost function is $$\varsigma = \sum_k \sum_j [\rho_{jk}^{T_j} u_{djk}^{T_j}(x_{jk}^{T_j})]^2,$$

where $\rho$ is a vector of parameters of components of the building model and electric grid model, $u_d$ is a basis vector of d-degree polynomials, where a dimension of $\rho$ and $u(x)$ is given by $$|u_d| = \binom{|x|+d}{d},$$

x is a vector of decision variables of the building model and electric grid model, j is an index over the components of the building model and electric grid model, $T_j$ denotes one of the components of the building model and electric grid model, and k is an index of time measurements of the parameters and decision variable values, and the constraints are $P^{BL}(x)=0$, $P^{EG}(x)=0$, $P^{IF}(x)=0$, and $x \geq 0$, where $P^{BL}(x)$, $P^{EG}(x)$, and $P^{IF}(x)$ are sets of polynomials defining to the building (BL) model constraints, the electric grid (EG) model constraints, and the building-grid interface model (IF) constraints, respectively.

According to a further aspect of the invention, the components of the building model include the electric and absorption chillers, a group of chillers, a group of the plurality of buildings, the generators, the gas turbines, the HRSG units, the pumps, the steam turbines, the thermal energy storages, and the components of the electric grid model include loads, nodes, and terminals.

According to a further aspect of the invention, the cost function is reformulated in a semi-definite programming format as $$\min_X C \cdot X,$$
$$\text{s.t. } \mathcal{A}^{BL}(X) = b^{BL}$$
$$\mathcal{A}^{EG}(X) = b^{EG}$$
$$\mathcal{A}^{IF}(X) = b^{IF}$$
$$X \succeq 0,$$
$$\text{rank}(X) = 1,$$

by reformulating non-linear terms in the cost function and constraints as bilinear terms and using a matrix inner product operator on the bilinear terms, where C is a matrix formed of the parameters of the components of the building model and electric grid model, X is a matrix formed of the decision variables of the building model and electric grid model, $A^{BL}(X)$, $A^{EG}(X)$, and $A^{IF}(X)$ are reformulations of the building (BL) model constraints, the electric grid (EG) constraints, and the building-grid interface model (IF) constraints, respectively, in a semi-definite programming format, $b^{BL}$, $b^{EG}$, and $b^{IF}$ are constants derived from the constraints of the building model and electric grid model, and $$X = \begin{bmatrix} 1 & x^T \\ x & xx^T \end{bmatrix}.$$

According to a further aspect of the invention, the method includes relaxing the condition rank(X)=1, and solving a following primal semi-definite program $$\min_X C \cdot X - \mu \ln(\det(X))$$
$$\text{subject to } \mathcal{A}^{BL}(X) = b^{BL},$$
$$\mathcal{A}^{EG}(X) = b^{EG},$$
$$\mathcal{A}^{IF}(X) = b^{IF},$$
$$X \succ 0,$$

for positive real values of $\mu$ as $\mu$ approaches zero.

According to a further aspect of the invention, solving the primal semi-definite program includes imposing optimality conditions on the primal semi-definite program to derive $$C - Z - \tilde{\mathcal{A}}^{BL}(y^{BL}) - \tilde{\mathcal{A}}^{EG}(y^{EG}) - \tilde{\mathcal{A}}^{IF}(y^{IF}) = 0,$$
$$\mathcal{A}^{BL}(X) - b^{BL} = 0,$$
$$\mathcal{A}^{EG}(X) - b^{EG} = 0,$$
$$\mathcal{A}^{IF}(X) - b^{IF} = 0,$$
$$XZ - \mu I = 0,$$

where $Z = \mu X^{-1}$, $X \succ 0$, and $\tilde{\mathcal{A}}^{BL}(y^{BL})$, $\tilde{\mathcal{A}}^{EG}(y^{EG})$ and $\tilde{\mathcal{A}}^{IF}(y^{IF})$ are transposes of $A^{BL}(y^{BL})$, $A^{EG}(y^{EG})$ and $A^{IF}(y^{IF})$ where $y^{BL}$, $y^{EG}$ and $y^{IF}$ are variables in a dual program of the primal semi-definite program, initializing a solution (X, y, Z) to an initial point $(X^0, y^0, Z^0)$ where $X^0 \succ 0, Z^0 \succ 0$, choosing a search direction ($\Delta X, \Delta y, \Delta Z$), choosing a primal step length $\alpha_p$ and a dual step length $\alpha_d$ that satisfy $X + \alpha_p \Delta X \succ 0$ and $Z + \alpha_d \Delta Z \succ 0$, and updating $X \leftarrow X + \alpha_p \Delta X$ and $(y, Z) \leftarrow \alpha_d(\Delta y, \Delta Z)$.

According to a further aspect of the invention, the method includes repeating the steps of choosing a search direction, choosing a primal step length and a dual step length, and updating a current iterate (X, y, Z) until the current iterate satisfies a stopping condition.

According to a further aspect of the invention, choosing a search direction comprises solving $$\Delta Z + \tilde{\mathcal{A}}^{BL}(\Delta y^{BL}) + \tilde{\mathcal{A}}^{EG}(\Delta y^{EG}) + \tilde{\mathcal{A}}^{IF}(\Delta y^{IF}) = -r^X,$$
$$\mathcal{A}^{BL}(\Delta X) = -r^{BL},$$
$$\mathcal{A}^{EG}(\Delta X) = -r^{EG},$$
$$\mathcal{A}^{IF}(\Delta X) = -r^{IF},$$
$$\mathcal{H}_P((\Delta X)Z + X \Delta Z) = -r^{XZ},$$

where $$r^X = C - \Delta Z - \tilde{\mathcal{A}}^{BL}(\Delta y^{BL}) - \tilde{\mathcal{A}}^{EG}(\Delta y^{EG}) - \tilde{\mathcal{A}}^{IF}(\Delta y^{IF}),$$
$$r^{BL} = \mathcal{A}^{BL}(X) - b^{BL},$$
$$r^{EG} = \mathcal{A}^{EG}(X) - b^{EG},$$
$$r^{IF} = \mathcal{A}^{IF}(X) - b^{IF},$$
$$r^{XZ} = \mathcal{H}_P(XZ) - \sigma \mu I,$$

$\sigma \in [0,1]$, $H_P(XZ) = \frac{1}{2}(PXZP^{-1} + (PXZP^{-1})^T)$, and $H_P(\Delta XZ + X\Delta Z) = \frac{1}{2}(P(\Delta XZ + X\Delta Z)P^{-1} + (P(\Delta XZ + X\Delta Z)P^{-1})^T)$ for a non-singular matrix $P$.

According to another aspect of the invention, there is provided a method for optimizing a cost of electric power generation in a smart site energy management model, including providing a semidefinite program $$\min_X C \cdot X - \mu \ln(\det(X))$$

subject to $\mathcal{A}^{BL}(X) = b^{BL}$, $\mathcal{A}^{EG}(X) = b^{EG}$, $\mathcal{A}^{IF}(X) = b^{IF}$, $X \succ 0$, where $C \cdot X$ is a cost function that models a smart building-grid energy system of a plurality of buildings on a site interconnected with electric power grid energy resources where C is a matrix formed of parameters of components of a building model and an electric grid model, X is a matrix formed of decision variables of the building model and electric grid model, $A^{BL}(X)$, $A^{EG}(X)$, and $A^{IF}(X)$ are constraints due to a building (BL) model, an electric grid (EG) model, and an building-grid interface model (IF), respectively, in a semidefinite programming format, $b^{BL}$, $b^{EG}$, and $b^{IF}$ are constants derived from the constraints of the building model and electric grid model, and $$X = \begin{bmatrix} 1 & x^T \\ x & xx^T \end{bmatrix},$$

where a rank condition on X has been relaxed, and solving $$\min_X C \cdot X - \mu \ln(\det(X)),$$

subject to the constraints, for positive real values of $\mu$ as $\mu$ approaches zero.

According to a further aspect of the invention, $C \cdot X$ is derived by reformulating non-linear terms in a function C and constraints $P^{BL}(x)=0$, $P^{EG}(x)=0$, $P^{IF}(x)=0$, and $x \geq 0$, as bilinear terms, using a matrix inner product operator on the bilinear terms to reformulate the bilinear terms in a semi-definite programming format, where $$\varsigma = \sum_k \sum_j [\rho_{jk}^{T_j} u_{djk}^{T_j}(x_{jk}^{T_j})]^2,$$

where $\rho$ is a vector of parameters of components of the building model and electric grid model, $u_d$ is a basis vector of d-degree polynomials, where a dimension of $\rho$ and $u(x)$ is given by $$|u_d| = \binom{|x|+d}{d},$$

x is a vector of decision variables of the building model and electric grid model, j is an index over the components of the building model and electric grid model, $T_j$ denotes one of the components of the building model and electric grid model, and k is an index of time measurements of the parameters and decision variable values, and $P^{BL}(x)$, $P^{EG}(x)$, and $P^{IF}(x)$ are sets of polynomials defining the building (BL) model constraints, the electric grid (EG) model constraints, and the building-grid interface model (IF) constraints, respectively.

According to a further aspect of the invention, decision variables for each of the building model, the electric grid model, and the building-grid interface model are box-constrained.

According to a further aspect of the invention, the building model includes a plurality of buildings, one or more gas turbines and generators as on-site sources for electricity power, electric chillers, pumps and thermal energy storage tanks, where waste heat in exhaust gas from the gas turbines is used to generate steam in one or more heat recovery steam generator (HRSG) units, steam from the HRSG units drives one or more absorption chillers to generate cooling, steam turbines to drive additional electricity generators, or provides heating needs for the plurality of buildings, the electric grid includes one or more loads and is modeled as an undirected graph G=(N, E), where N and E denote sets of electric nodes and branches, respectively, where each branch has an origin terminal and a destination terminal, each terminal is connected to an electric node, a voltage at node $n_1$ is a complex number defined by its magnitude and angle, and a power flow at terminal $t_1$ is a complex number defined by its real and imaginary parts, and the building-grid interface model constrains a building cooling load to be satisfied by chiller operations at all times, and an electricity load to be satisfied by on-site generation and the electric grid.

According to another aspect of the invention, there is provided a non-transitory program storage device readable by a computer, tangibly embodying a program of instructions executed by the computer to perform the method steps for optimizing a cost of electric power generation in a smart site energy management model.

BRIEF DESCRIPTION OF THE DRAWINGS

FIG. 1 illustrates a smart site energy management system architecture, according to an embodiment of the invention.

FIG. 2 illustrates a typical Combined Cooling, Heating and Power (CCHP) system, according to an embodiment of the invention.

FIG. 3 illustrates a unified electric grid branch model, according to an embodiment of the invention.

FIGS. 4(a)-(b) illustrates up-to-eighth-order Taylor series approximations of the cos(x) and sin(x), respectively, over the theoretical range $x \in [-\pi, \pi]$, according to an embodiment of the invention.

DETAILED DESCRIPTION OF EXEMPLARY EMBODIMENTS

Figure 5:
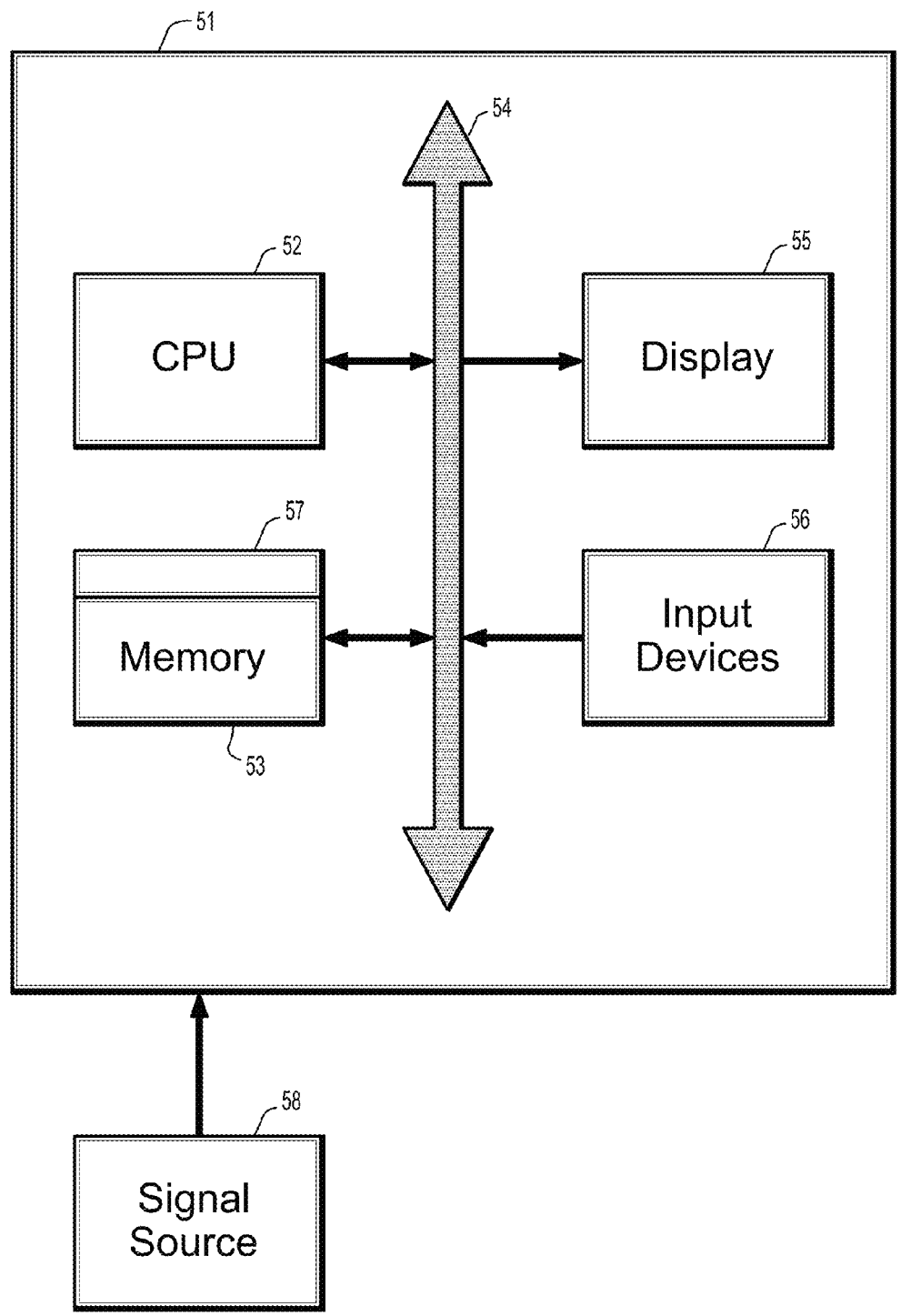
FIG. 5 is a block diagram of an exemplary computer system for implementing a method for convex relaxation of an integrated building and energy management model, according to an embodiment of the invention.

Exemplary embodiments of the invention as described herein generally include systems and methods for convex relaxation of an integrated building and energy management model. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Notation:

The notation used throughout the present disclosure is summarized in the NOMENCLATURE Appendix following this specification. Most matrices occurring herein below will be real symmetric matrices of order n:$S_n$ denotes the space of such matrices. The notation x·y denotes the inner product of two equi-dimension vectors, defined by $x^T y$. The notation $M_1 \cdot M_2$ denotes the inner product between two such matrices, defined by $tr(M_1^T M_2)$. The associated norm is the Frobenius norm, written $\|M\|_F := (trM^T M)^{1/2}$ or just $\|M\|$, while $\|M\|_2$ denotes the $L_2$-operator norm of a matrix. Norms on vectors will always be Euclidean unless otherwise noted.

The notation $X \succeq 0$ ($X \succ 0$) means that X is positive semidefinite (positive definite). The matrices involved in these binary operations are always symmetric matrices. The notation $S_+^n$ ($S_{++}^n$) denotes the set of positive semidefinite (positive definite) symmetric matrices of order n. The notation $X \preceq Y$ or $Y \succeq X$ means that $Y - X \succeq 0$. The notation $X \prec Y$ or $Y \succ X$ means that $Y - X \prec 0$. If $X \succ 0$, then write $X^{1/2}$ for the square root of X.

The notation diag(X) denotes the vector of diagonal entries of X. X denotes the diagonal matrix with the vector x as its diagonal. This notation can be extended to general block diagonal matrices: if $M_1, M_2, \ldots, M_k \in S^n$, then diag $(M_1, \ldots, M_k)$ denotes the block diagonal matrix with the $M_i$'s on its diagonal. Lower-case Roman letters denote vectors and uppercase letters denote matrices.

Additional symbols used here are dual variables, which will be mnemonically displayed on top of the corresponding equality or inequality symbols. If x is a variable, then $\underline{x}$ and $\overline{x}$ denote its lower limit and upper limit, respectively. Other symbols with a narrower scope are defined in the subsections where they are used. The symbol $\pi_{ijk}^{CH}$ denotes the i-th parameter of the j-th chiller (i.e. CH) at time step k; the symbol $x_{ijk}^{CH}$ denotes the i-th decision of the j-th chiller (i.e. CH) at time step k; and similarly for the other building-electric-grid resources; e.g. pump (PM); generator (GN), and node (ND). In particular, the letter k is a time index, and a parameter or variable subscripted by k means a measurement of the corresponding value at time k, and sums over k are sums over measurements of the corresponding subscripted term at times k.

I. Optimization Model Formulation

FIG. 1 depicts an exemplary, non-limiting smart site energy management system architecture, according to an embodiment of the invention. A smart site is roughly defined as an interconnection of buildings and electric power grid energy resources within a clearly defined boundary. A smart site is a strategic or self-interested entity that seeks to maximize some utility function subject to all applicable technical and budget constraints. The utility function is a measure of energy efficiency. The smart site 10 according to an embodiment of the invention depicted in FIG. 1 includes human-machine interfaces (HMIs) 11 that visualize results, data analytics engines and smart application servers 12, distributed communications 13, and connections 14 to the utility energy grid via auto-reclosers.

I.1. Building Model Constraints

Embodiments of the invention consider a small Combined Cooling, Heating and Power (CCHP) system that provides heating, cooling and electricity power to a single building or complex that has a group of several buildings. CCHP is a popular technology that integrates cooling, heating and power generation capabilities on one site. The keystone of CCHP is that waste heat from a prime mover, such as a gas turbine, can be utilized to meet a variety of thermal and power needs in the complex.

A schematic plot of an exemplary, non-limiting CCHP system is shown in FIG. 2. A gas turbine (GT) and generator (G) serve as the primary on-site source for electricity power. The waste heat in the exhaust gas from gas turbine is used to generate steam in heat recovery steam generator (HRSG) unit. Steam from the HRSG unit can either drive the absorption chiller (AC) to generate cooling, or drive a steam turbine (ST) to drive an additional electricity generator (G), or provide heating needs in the facility. Electric chillers (EC) and thermal energy storage (TES) tanks are also typical in such systems.

Optimization of a CCHP system is often performed on a steady state model, assuming that transients die out very fast. Chandan, et al, referenced above, proposed a collection of reduced order models for components such as chillers, TES, HRSG, gas turbine for the purpose of optimization.

However, embodiments of the invention can eliminate all task specific features and retain only the functional structures from the models in Chandan, et al. to abstract the following set of constraints on model variables. These constraints are used to formulate an optimization for a general class of building/CCHP systems. In the model equations below, the notation $\mathbb{P}$ k refers to a $k^{th}$-order polynomial whose coefficients can be determined from a regression analysis. Note that these model equations are exemplary and non-limiting, and other embodiments of the invention can include other components models and other sets of constraints.

(1) Chiller (CH) Model: These equations describe a typical model according to an embodiment of the invention for chillers in a variable primary flow system. Under certain simplifying assumptions, the amount of cooling produced by a chiller is determined from chilled water mass flow rate through the chiller, expressed in EQ. (1a). The corresponding electricity consumption is determined by EQ. (1b).

$$x_{3ck}^{CH} = x_{4ck}^{CH} \pi_{3wk}^{CH} (x_{1gk}^{CH} - x_{2gk}^{CH}) \quad \text{1a}$$

$$x_{1ck}^{CH} = \mathbb{P}_1(x_{3ck}^{CH}) \tag{1b}$$

(2) Thermal Storage (TS) Model: The following constraints describe a stratified, two-layered model according to an embodiment of the invention for thermal energy storage tank. The constraints of EQS. (2) model the charging mode requirements. The constraints of EQS. (3) enforce the discharge mode requirements. The thermodynamics of the two layers are described by a pair of ordinary differential equations; energy and mass conservation at mixing valves are included as equality constraints.

$$x_{7tk}^{TS} = x_{2gk}^{CG} - x_{1mk}^{CM} \tag{2a}$$

$$\pi_{1wk}^{WR}\pi_{3wk}^{WR}\frac{dx_{1tk}^{TS}}{dt} = \pi_{3tk}^{TS}x_{7tk}^{TS}\pi_{3wk}^{WR}(x_{2tk}^{TS} - x_{1tk}^{TS}) + \pi_{7tk}^{TS}\pi_{9tk}^{TS}(x_{2tk}^{TS} - x_{1tk}^{TS}) \tag{2b}$$

$$\pi_{1wk}^{WR}\pi_{3wk}^{WR}\frac{dx_{2tk}^{TS}}{dt} = \pi_{8tk}^{TS}x_{7tk}^{TS}\pi_{3wk}^{WR}(x_{3tk}^{TS} - x_{2tk}^{TS}) + \pi_{7tk}^{TS}\pi_{9tk}^{TS}(x_{1tk}^{TS} - x_{2tk}^{TS}) \tag{2c}$$

$$x_{3tk}^{TS} = x_{2mk}^{CM} - \pi_{1gk}^{CG} \tag{2d}$$

$$x_{2gk}^{CG}x_{1gk}^{CG} = x_{7tk}^{TS}x_{4tk}^{TS} + x_{1mk}^{CM}x_{3mk}^{CM} \tag{2e}$$

$$x_{7tk}^{TS} = x_{1mk}^{CM} - x_{2gk}^{CG} \tag{3a}$$

$$\pi_{1wk}^{WR}\pi_{3wk}^{WR}\frac{dx_{1tk}^{TS}}{dt} = \pi_{4tk}^{TS}x_{7tk}^{TS}\pi_{3wk}^{WR}(x_{6tk}^{TS} - x_{1tk}^{TS}) + \pi_{5tk}^{TS}\pi_{9tk}^{TS}(x_{2tk}^{TS} - x_{1tk}^{TS}) \tag{3b}$$

$$\pi_{1wk}^{WR}\pi_{3wk}^{WR}\frac{dx_{2tk}^{TS}}{dt} = \pi_{6tk}^{TS}x_{7tk}^{TS}\pi_{3wk}^{WR}(x_{1tk}^{TS} - x_{2tk}^{TS}) + \pi_{5tk}^{TS}\pi_{9tk}^{TS}(x_{1tk}^{TS} - x_{2tk}^{TS}) \tag{3c}$$

$$x_{1mk}^{CM}x_{2mk}^{CM} = x_{7tk}^{TS}x_{5tk}^{TS} + x_{2gk}^{CG}x_{1gk}^{CG} \tag{3d}$$

$$x_{6tk}^{TS} = x_{1gk}^{CG} = x_{3mk}^{CM} \tag{3e}$$

(3) Gas Turbine (GT) Model: The constraints of EQS. (4) are data-driven models according to embodiments of the invention for selected input and outputs of the gas turbine, obtained through regression analysis. The input variable is the desired electrical power produced by the gas turbine. The output variables of interest are the corresponding values of natural gas mass flow rate, exhaust gas mass flow rate and turbine exit temperature.

$$x_{7tk}^{TS} = \mathbb{P}_1(x_{3gk}^{GT}) \tag{4a}$$

$$x_{1gk}^{GT} = \mathbb{P}_2(x_{3gk}^{GT}) \tag{4b}$$

$$x_{2gk}^{GT} = \mathbb{P}_4(x_{3gk}^{GT}) \tag{4c}$$

(4) Heat Recovery Steam Generator (HR): The HRSG includes multiple components such as super-heater, economizer, boilers, etc. For simplicity of exposition, embodiments of the invention can model the HRSG as a lumped, counter-flow heat exchanger.

$$x_{3hk}^{HR} = \mathbb{P}_1(x_{6hk}^{HR}) \tag{5a}$$

$$\pi_{2wk}^{WR} = \mathbb{P}_1(x_{6hk}^{HR}) \tag{5b}$$

$$x_{5hk}^{HR} = \pi_{1hk}^{HR}x_{7hk}^{HR} \tag{5c}$$

$$x_{2gk}^{GT} - x_{4hk}^{HR} = \pi_{2hk}^{HR}(x_{2gk}^{GT} - x_{1hk}^{HR}) \tag{5d}$$

$$\tilde{x}_{3gk}^{HR}x_{8hk}^{HR} = x_{1gk}^{GT}(x_{2gk}^{GT} - x_{4hk}^{HR}) \tag{5e}$$

$$x_{2hk}^{HR} = \begin{cases} 0, & \tilde{x}_{3gk}^{HR} < \tilde{x}_{1gk}^{HR} \\ x_{3hk}^{HR} + \frac{1}{\pi_{1gk}^{GS}}(\tilde{x}_{3gk}^{HR} - \tilde{x}_{2gk}^{HR}), & \tilde{x}_{3gk}^{HR} \geq \tilde{x}_{2gk}^{HR} \\ x_{3hk}^{HR}, & o.w. \end{cases} \tag{5f}$$

$$\tilde{x}_{1gk}^{HR} = \pi_{3wk}^{WR}(x_{1hk}^{HR} - x_{3hk}^{HR}) \tag{5g}$$

$$\tilde{x}_{2gk}^{HR} = \pi_{3wk}^{WR}(x_{1hk}^{HR} - x_{3hk}^{HR}) + \pi_{2wk}^{WR} \tag{5h}$$

(5) Steam Loop: The steam loop may be defined as the section of the CCHP system associated with the co-generated steam used to meet heating demands and drive steam turbines for power production. A simplified model according to an embodiment of the invention for the steam loop is given by EQS. (6), where $x_{8hk}^{HR}$ denotes the mass flow rate (kg/s) of steam used to drive steam turbine, and $x_{1sk}^{ST}$ denotes the electrical power produced (MW) by steam turbine.

$$x_{2sk}^{ST} = x_{3sk}^{ST}x_{8hk}^{HR} \tag{6a}$$

$$x_{4mk}^{CM} = (1 - x_{3sk}^{ST})x_{8hk}^{HR} \tag{6b}$$

$$\pi_{1wk}^{WR}x_{11k}^{PM} = x_{2sk}^{ST}(\pi_{1dk}^{DA} - \pi_{1ck}^{CD}) \tag{6c}$$

$$x_{12k}^{PM} = \frac{x_{8hk}^{HR}}{\pi_{1wk}^{WR}}(x_{7hk}^{HR} - \pi_{1dk}^{DA}) \tag{6d}$$

$$x_{1sk}^{ST} = 10^{-3}x_{2sk}^{ST}\pi_{1gk}^{GS}\pi_{1sk}^{ST}x_{2hk}^{HR}\left(1 - (\pi_{1ck}^{CD}/x_{5hk}^{HR})^{\frac{1}{4}}\right) \tag{6e}$$

(6) Variable Constraints: All building model decision variables in according to embodiments of the invention are box constrained, in that they have lower and upper limits.

$$\underline{x}_{igk}^{CG} \leq x_{igk}^{CG} \leq \bar{x}_{igk}^{CG}, \forall i, \forall g, \forall k \tag{7a}$$

$$\underline{x}_{ick}^{CH} \leq x_{ick}^{CH} \leq \bar{x}_{ick}^{CH}, \forall i, \forall c, \forall k \tag{7b}$$

$$\underline{x}_{imk}^{CM} \leq x_{imk}^{CM} \leq \bar{x}_{imk}^{CM}, \forall i, \forall m, \forall k \tag{7c}$$

$$\underline{x}_{igk}^{GT} \leq x_{igk}^{GT} \leq \bar{x}_{igk}^{GT}, \forall i, \forall g, \forall k \tag{7d}$$

$$\underline{x}_{ihk}^{HR} \leq x_{ihk}^{HR} \leq \bar{x}_{ihk}^{HR}, \forall i, \forall h, \forall k \tag{7e}$$

$$\underline{x}_{ipk}^{PM} \leq x_{ipk}^{PM} \leq \bar{x}_{ipk}^{PM}, \forall i, \forall p, \forall k \tag{7f}$$

$$\underline{x}_{isk}^{ST} \leq x_{isk}^{ST} \leq \bar{x}_{isk}^{ST}, \forall i, \forall s, \forall k \tag{7g}$$

$$\underline{x}_{itk}^{TS} \leq x_{itk}^{TS} \leq \bar{x}_{itk}^{TS}, \forall i, \forall t, \forall k \tag{7h}$$

I.2. Electric Grid Model Constraints

An electric grid (EG) can be modeled as a standard undirected graph G=(N, E), where N and E denote the sets of electric nodes and branches, respectively. A branch has two terminals: origin and destination terminals. Each terminal is connected to an electric node. Examples of electric branches are underground or overhead lines, on-load tap transformers, phase-shifting transformers, series reactors and series capacitors. In concept, generators, loads, and shunt devices, such as shunt capacitors and reactors, can be modeled as branch devices with one of their associated terminals connected to ground.

FIG. 3 depicts a unified branch model of an electric grid according to an embodiment of the invention, whereby the subsequent equations can be readily derived. On the left, a generator $s_k$ is connected to node k, and load $s_l$ is connected to node l on the right. The branch model includes transformer taps between nodes k and k', and between nodes l' and l, with branches connecting to internal nodes k' and l'. The voltage at node $n_1$ is a complex number defined by its magnitude and angle, here denoted $x_{1n_1}^{ND}$ and $x_{2n_1}^{ND}$, respectively. The power flow at terminal $t_1$ is a complex number defined by its real and imaginary parts, here denoted $x_{1n_1}^{TE}$ and $x_{2n_1}^{TE}$, respectively. The symbol $\pi_1^{BR}$ denotes the series admittance of the branch connected to terminals $t_1$ and $t_2$; $\pi_2^{BR}$ and $\pi_3^{BR}$ model the shunt admittances of the branch, and $\pi_4^{BR}$ and $\pi_5^{BR}$ model the transformation ratio between the branch external and internal nodes, at the origin and destination nodes, respectively.

The aforementioned grid resource model according to an embodiment of the invention is sufficiently general to include practical management models of some distributed energy resources such as PV generators and their inverter interfaces, as well as batteries. For example, several PV and battery resources management models known in the art are linear and are supported by a general framework according to an embodiment of the invention.

Terminal Constraints:

According to an embodiment of the invention, the following set of constraints are defined for all terminals t, at all times k. The flow at a terminal t is defined in terms of the voltage of the node associated with the terminal, here denoted n(t), as well as the voltage of the node associated with a terminal, referred to herein as its branch-image terminal, here denoted $n(\tilde{t})$.

$$x_{1tk}^{TE} = \pi_{1tk}^{TE} x_{1n(t)k}^{ND} x_{1n(t)k}^{ND} + x_{1n(t)k}^{ND}$$
$$x_{1n(\tilde{t})k}^{ND} \{\pi_{2tk}^{TE} \cos(x_{1n(t)k}^{ND} - x_{1n(\tilde{t})k}^{ND}) + \pi_{4tk}^{TE} \sin(x_{1n(t)k}^{ND} - x_{1n(\tilde{t})k}^{ND})\}$$ (8a)

$$x_{1tk}^{TE} = \pi_{1tk}^{TE} x_{1n(t)k}^{ND} x_{1n(t)k}^{ND} + x_{1n(t)k}^{ND}$$
$$x_{1n(\tilde{t})k}^{ND} \{\pi_{2tk}^{TE} \cos(x_{1n(t)k}^{ND} - x_{1n(\tilde{t})k}^{ND}) + \pi_{4tk}^{TE} \sin(x_{1n(t)k}^{ND} - x_{1n(\tilde{t})k}^{ND})\}$$ (8a)

$$x_{2tk}^{TE} = -\pi_{3tk}^{TE} x_{1n(t)k}^{ND} x_{1n(t)k}^{ND} + x_{1n(t)k}^{ND}$$
$$x_{1n(\tilde{t})k}^{ND} \{\pi_{2tk}^{TE} \sin(x_{1n(t)k}^{ND} - x_{1n(\tilde{t})k}^{ND}) - \pi_{4tk}^{TE} \cos(x_{1n(t)k}^{ND} - x_{1n(\tilde{t})k}^{ND})\}$$ (8b)

$$(x_{1tk}^{TE})^2 + (x_{2tk}^{TE})^2 \le \pi_{1tk}^{TE}$$ (8c)

The constraints of EQ. (8a) define the real part of the power flow at terminal t at time k. The constraints of EQ. (8b) define the imaginary part of the power flow at terminal t at time k. The constraints of EQ. (8c) enforce the thermal rating at terminal t at time k. These constraints contain nonlinear terms involving the sine and cosine functions. Here, embodiments of the invention replace these functions by polynomial approximations using the Taylor series expansions, up to seventh order. FIGS. 4(a)-(b) in illustrates up-to-eighth-order Taylor series approximations of the cos(x) and sin(x), respectively, over the theoretical range $x \in [-\pi,\pi]$, which largely covers the angle range for all practical operational and planning purposes, according to an embodiment of the invention. FIGS. 4(a)-(b) shows the quality of this approximation, respectively, for the sine ($P_1$, $P_3$, $P_5$, and $P_7$) and cosine ($P_2$, $P_4$, $P_6$, and $P_8$), the seventh order of each of which is highly-accurate for most realistic grid operation and planning modeling purposes. According to embodiments, the node angle differences are more restricted so that lower order polynomial approximations may be appropriate, thereby decreasing the size of the optimization model.

The constraints of EQS. (8a) and (8b) introduce hard nonlinearity and non-convexity into the feasible region of grid management models according to embodiments of the invention. However, note that these constraints exhibit sparsity, owing to the dependency of $x_{tk}^{TE}$ on two 2-dimensional variables, $x_{n(t)}^{ND}$ and $x_{n(\tilde{t})}^{ND}$.

Node Constraints:

According to embodiments, the following set of constraints are defined for all nodes n, at all times k.

$$\sum_{\{g|n(g)=n\}} x_{1gk}^{GN} - \sum_{\{l|n(l)=n\}} x_{1lk}^{LD} - \sum_{t|n(t)=n} x_{1tk}^{TE} = 0$$ (9a)

$$\sum_{\{g|n(g)=n\}} x_{2gk}^{GN} - \sum_{\{l|n(l)=l\}} x_{2lk}^{LD} - \sum_{t|n(t)=n} x_{2tk}^{TE} = 0$$ (9b)

where n(t) refers to all nodes n associated with a particular terminal t. The constraints of EQ. (9a) state that, for every node n, at every time k, the real part of the total power produced minus the real part of the total power consumed is equal to the net power injected to the electric grid. The constraints of EQ. (9b) state that, for every node n, at every time k, the imaginary part of the total power produced minus the imaginary part of the total power consumed is equal to the net power injected to the electric grid.

Note that EQS. (9) are highly sparse since the degree of nodes in real-world electric grids is typically small (1 to 5 branches per node).

Variable Constraints:

According to embodiments of the invention, all electric grid decision variables are box constrained; that is, they admit lower and upper bounds.

$$\underline{x}_{igk}^{GN} \le x_{igk}^{GN} \le \overline{x}_{igk}^{GN}, \forall i, \forall g, \forall k$$ (10a)

$$\underline{x}_{ilk}^{LD} \le x_{ilk}^{LD} \le \overline{x}_{ilk}^{LD}, \forall i, \forall l, \forall k$$ (10b)

$$\underline{x}_{itk}^{TE} \le x_{itk}^{TE} \le \overline{x}_{itk}^{TE}, \forall i, \forall t, \forall k$$ (10c)

$$\underline{x}_{ink}^{ND} \le x_{ink}^{ND} \le \overline{x}_{ink}^{ND}, \forall i, \forall n, \forall k$$ (10d)

I.3. Building-Grid Interface Constraints

Embodiments of the invention express the constraints that link building and electric grid management models as follows:

$$\sum_c x_{3ck}^{CH} = \sum_m \pi_{3mk}^{CM}, \forall k$$ (11a)

$$\sum_m \pi_{5mk}^{CM} + \sum_g \pi_{1gk}^{GT} + \sum_s x_{1sk}^{ST} = \sum_m \pi_{2mk}^{CM} + \sum_p x_{1pk}^{PM} + \sum_c x_{1ck}^{CH},$$ (11b)
$$\forall k$$

EQ. (11a) requires that the campus cooling load is satisfied by the operation of chillers at all time. EQ. (11b) ensures that the electricity load on campus is satisfied by on-site generation and power grid.

I.4. Objective Function

Embodiments of the invention may assume a generic objective function to be minimized, which may be cast as a piecewise linear function or a sum of squares (SOS) polynomial. A polynomial $p \in R_{2d}[x]$ is an SOS polynomial if there exists k polynomials, $\{\tilde{p}_i\}_{i=1}^k \in R[x]$, such that $p(x) = \sum_{i=1}^k \tilde{p}_i(x)^2$. Let $S_{2d}[x]$ denote the set of SOS polynomial in x of degree at most 2d. For example, $p(x_1,x_2) = (x_1^2 - 3x_2 - 1)^2 + (2x_1x_2 + x_1 - 5)^2$ is an SOS polynomial of degree 4, with k=2, $\tilde{p}_1(x_1,x_2) = x_1^2 - 3x^2 - 1$, and $\tilde{p}_2(x_1,x_2) = 2x_1x_2 + x_1 - 5$.

Note that a d-degree polynomial $p \in R_d[x]$ may be cast as $p(x) = \rho^T u_d(x)$, where $\rho \in R^{|u_d|}$ is a vector of parameters $\pi_{ijk}^{XY}$, and $u_d(x) \in R^{|u_d|}$ is a basis vector of r-degree polynomials. The dimension of $\rho$ and u(x) is given by $$|u_d| = \binom{|x| + d}{d},$$

i.e., the number of combinations of d in |x|+d. The vector $u_d(x)$ may be expanded, in terms of the basis elements, as $u_d(x) = \text{vec}\{1, x_1, x_2, \ldots, x_n, x_1^2, x_1, x_2, x_3, \ldots, x_1^r, \ldots, x_n^r\}$. For example, if $x \in R^3$ and $p \in P_2[x]$, one has $u_2(x_1, x_2, x_3) = \text{vec}\{1, x_1, x_2, x_3, x_1^2, x_1x_2, x_1x_3, x_2^2, x_2x_3, x_3^2\}$.

Using the aforementioned notation, a set of 2d-degree SOS polynomials can be formally written as follows:

$$\mathbb{S}_{2d}[x] = \left\{ \sum_{j=1}^{k} (\rho_j^T u_d(x)) : k \geq 1, \rho_j \in \mathbb{R}^{\binom{|x|+d}{d}} \right\}. \quad (12)$$

A smart site optimization model objective function according to an embodiment of the invention includes decomposable terms of subsets of building and/or electric grid model variables. Using the aforementioned notation, a smart site objective function, $\varsigma$, according to an embodiment of the invention, takes the form $$\varsigma = \sum_k \sum_j [\rho_{jk}^{Tj} u_{djk}^{Tj}(x_{jk}^{Tj})]^2$$

where T one of the model components and j represents the corresponding subscripts, respectively, and may be cast as follows:

$$\zeta = \sum_k \left\{ \sum_g [\rho_{gk}^{CG} \cdot u_{dgk}^{CG}(x_{gk}^{CG})]^2 + \sum_c [\rho_{ck}^{CH} \cdot u_{dck}^{CH}(x_{ck}^{CH})]^2 + \right. \quad (13)$$

$$\sum_m [\rho_{mk}^{CM} \cdot u_{dmk}^{CM}(x_{mk}^{CM})]^2 + \sum_g [\rho_{gk}^{GN} \cdot u_{dgk}^{GN}(x_{gk}^{GN})]^2 +$$

$$\sum_{gl} [\rho_{gk}^{GT} \cdot u_{dgk}^{GT}(x_{gk}^{GT})]^2 + \sum_h [\rho_{hk}^{HR} \cdot u_{dhk}^{HR}(x_{hk}^{HR})]^2 +$$

$$\sum_l [\rho_{lk}^{LD} \cdot u_{dlk}^{LD}(x_{lk}^{LD})]^2 + \sum_n [\rho_{nk}^{ND} \cdot u_{dnk}^{ND}(x_{nk}^{ND})]^2 +$$

$$\sum_p [\rho_{pk}^{PM} \cdot u_{dpk}^{PM}(x_{pk}^{PM})]^2 + \sum_s [\rho_{sk}^{ST} \cdot u_{dsk}^{ST}(x_{sk}^{ST})]^2 +$$

$$\left. \sum_t [\rho_{tk}^{TE} \cdot u_{dtk}^{TE}(x_{tk}^{TE})]^2 + \sum_t [\rho_{tk}^{TS} \cdot u_{dtk}^{TS}(x_{tk}^{TS})]^2 \right\},$$

where the symbols $U_{dgk}^{CG}(x_{gk}^{CG}), \ldots, u_{dtk}^{TS}(x_{tk}^{TS})$ denote basis vectors of at most d-degree polynomials with appropriate dimensions, as defined above, e.g., in EQ. (12).

According to embodiments, only a small subset of variables typically appear in the objective function. Hence, the objective function parameters (i.e. $\rho_j$'s) are highly sparse. For example, the cost of electricity purchased from the external electric grid can be minimized together with the cost of fuel used to power the gas turbine. For this example, the objective function defined in EQ. (13) simplifies as follows:

$$\varsigma = \sum_k \left\{ \sum_m \rho_{mk}^{CM} x_{mk}^{CM} + \sum_g \rho_{gk}^{GT} x_{gk}^{GT} \right\} \quad (14)$$

In other energy management applications, the cost of generation is expressed as a quadratic function in the power produced by the generators. It is well-known that any polynomial of degree 2 in $x \in \mathbb{R}^{|x|}$, $|x| \geq 1$ can be cast as a sum of squares polynomials. In this case, the objective function is a quadratic:

$$\varsigma = \sum_k \sum_m [\rho_{gk}^{GN} \cdot u_{dgk}^{GN}(x_{gk}^{GN})]^2. \quad (15)$$

I.5 Compact Model

A smart side energy management optimization model according to an embodiment of the invention can minimize the objective function of EQ. (13) subject to the constraints of EQS. (1)-(11). Embodiments of the invention can recast the aforementioned model using matrix vector notation. It is conceivable that the matrices are highly sparse for medium- to large-scale real-life smart site models. First, the various decision variables may be packed into real vectors of appropriate dimensions:

$$x^{CG} = vec\{x_{1gk}^{CG}, x_{2gk}^{CG}\}_{g,k}, \quad (16a)$$

$$x^{CH} = vec\{x_{1ck}^{CH}, x_{2ck}^{CH}, x_{3ck}^{CH}, x_{4ck}^{CH}\}_{c,k}, \quad (16b)$$

$$x^{CM} = vec\{x_{1mk}^{CM}, x_{2mk}^{CM}, x_{3mk}^{CM}, x_{4mk}^{CM}, x_{5mk}^{CM}\}_{m,k}, \quad (16c)$$

$$x^{GN} = vec\{x_{1gk}^{GN}, x_{2gk}^{CN}\}_{g,k}, \quad (16d)$$

$$x^{GT} = vec\{x_{1gk}^{GT}, x_{2gk}^{GT}, x_{3gk}^{GT}, x_{4gk}^{GT}\}_{g,k}, \quad (16e)$$

$$x^{HR} = vec\{x_{1hk}^{HR}, x_{2hk}^{HR}, x_{3hk}^{HR}, x_{4hk}^{HR}, x_{5hk}^{HR}, x_{7hk}^{HR}, x_{8hk}^{HR}\}_{h,k}, \quad (16f)$$

$$x^{LD} = vec\{x_{1lk}^{LD}, x_{2lk}^{LD}\}_{l,k}, \quad (16g)$$

$$x^{ND} = vec\{x_{1nk}^{ND}, x_{2nk}^{ND}\}_{n,k}, \quad (16h)$$

$$x^{PM} = vec\{x_{1pk}^{PM}\}_{p,k}, \quad (16i)$$

$$x^{ST} = vec\{x_{1sk}^{ST}, x_{2sk}^{ST}, x_{3sk}^{ST}\}_{s,k}, \quad (16j)$$

$$x^{TE} = vec\{x_{1tk}^{TE}, x_{2tk}^{TE}\}_{t,k}, \quad (16k)$$

$$x^{TS} = vec\{x_{1tk}^{TS}, x_{2tk}^{TS}, x_{3tk}^{TS}, x_{4tk}^{TS}, x_{5tk}^{TS}, x_{6tk}^{TS}, x_{7tk}^{TS}, x_{8tk}^{TS}, x_{9tk}^{TS}\}_{t,k}, \quad (16l)$$

Finally, embodiments of the invention pack all the smart site optimization model decision variables in to a vector x with appropriate dimension:

$$x = vec\{x^{CG}, x^{CH}, x^{CM}, x^{GN}, x^{GT}, x^{HR}, x^{LD}, x_n^{ND}, x^{PM}, x^{TE}, x^{TS}\} \quad (17)$$

Projection matrices of appropriate dimensions, here denoted P*, may be used to obtain the aforementioned subvectors from x. For example, $x^{GN} = P^{GN}x$, and $x^{TE} = P^{TE}x$, where $P^{GN}$ and $P^{TE}$ are projection matrices.

A smart site energy management model according to an embodiment of the invention can be cast compactly as follows:

$$\min_x \varsigma(x) \quad (18a)$$

$$\text{s.t. } \mathcal{P}^{BL}(x) = 0 \quad (18b)$$

$$\mathcal{P}^{EG}(x) = 0 \quad (18c)$$

$$\mathcal{P}^{IF}(x) = 0 \quad (18d)$$

$$\underline{x} \leq x \leq \overline{x}, \quad (18e)$$

where $P^{BL}(x)$, $P^{EG}(x)$, and $P^{IF}(x)$ denote the sets of polynomials defining the building (BL) model constraints, the electric grid (EG) model constraints, and the building-grid interface model (IF) constraints, respectively:

$$\mathcal{P}^{BL}(x) = \text{vec}\{p_1^{BL}(x), \ldots, p_{c_b}^{BL}(x)\}, \quad (19a)$$

$$\mathcal{P}^{EG}(x) = \text{vec}\{p_1^{EG}(x), \ldots, p_{c_e}^{EG}(x)\}, \quad (19b)$$

$$\mathcal{P}^{IF}(x) = \text{vec}\{p_1^{IF}(x), \ldots, p_{c_i}^{IF}(x)\}, \quad (19c)$$

where $c_b$, $c_e$, and $c_i$ denote the number of building, electric grid, and interface constraints, respectively. The constraints of EQS. (17b), (17c) and (17d) are equivalent to EQS. (1)-(6), (8)-(9), and (11), respectively. The constraints of EQ. (17e) are equivalent to EQS. (7) and (10). The objective function $\xi$ is a linear sum of square polynomials in BL and EG decision variables.

Finally, embodiments standardize the model to the following format:

$$\min_x \varsigma(x) \quad (20a)$$

$$\text{s.t.} \quad \mathcal{P}^{BL}(x) = 0 \quad (20b)$$

$$\mathcal{P}^{EG}(x) = 0 \quad (20c)$$

$$\mathcal{P}^{IF}(x) = 0 \quad (20d)$$

$$x \geq 0. \quad (20e)$$

which is equivalently derived from EQS. (18) using the following procedure:

(i) change the variable reference: $x \leftarrow x - \underline{x}$, $\overline{x} \leftarrow \overline{x} - \underline{x}$;

(ii) rewrite the ensuing inequality constraints $x \leq \overline{x} - \underline{x}$ as equality constraints: $x + s = \overline{x}$, where $s \geq 0$ is an auxiliary variable;

(iii) append s to x; and (iv) append the new equality constraints to EQS. (20b) and (20c), as appropriate.

II. Semidefinite Relaxation

II.1 Sparse SDP Formulation

A smart site model according to an embodiment of the invention presented above is a nonlinear and nonconvex optimization model, possibly with a disconnected feasibility set. The constraints defining the feasible region contain linear and nonlinear terms. Embodiments may cast the nonlinear constraints in the smart side model as bilinear terms. This can be achieved by the addition of auxiliary variables wherever necessary. For example, the constraints of EQ. (4c) are equivalent to:

$$a_4 x_2^2 + a_3 x_2 x_1 + a_2 x_1^2 + a_1 x_1 = b_1, \quad (21a)$$

$$x_2 = x_1^2, \quad (21b)$$

EQ. (21a) is equivalent to $$\begin{pmatrix} 1 \\ x_1 \\ x_2 \end{pmatrix}^T \begin{bmatrix} 0 & \frac{1}{2}a_1 & 0 \\ \frac{1}{2}a_1 & a_2 & \frac{1}{2}a_3 \\ 0 & \frac{1}{2}a_3 & a_4 \end{bmatrix} \begin{pmatrix} 1 \\ x_1 \\ x_2 \end{pmatrix} = b_1, \quad (21c)$$

or, using the matrix inner product operator, to $$\begin{bmatrix} 0 & \frac{1}{2}a_1 & 0 \\ \frac{1}{2}a_1 & a_2 & \frac{1}{2}a_3 \\ 0 & \frac{1}{2}a_3 & a_4 \end{bmatrix} \cdot \begin{pmatrix} 1 \\ x_1 \\ x_2 \end{pmatrix} \begin{pmatrix} 1 \\ x_1 \\ x_2 \end{pmatrix}^T = b_1. \quad (21d)$$

The recast of EQ. (21b) to an equivalent form, using the matrix inner product operator, follows from the previous example.

According to embodiments of the invention, applying the scheme in EQ. (21), the smart-site energy management model of EQS. (18) can be reformulated at step 61 in a semi-definite programming format as in EQS. (22):

$$\min_X C \cdot X, \quad (22a)$$

$$\text{s.t.} \quad \mathcal{A}^{BL}(X) = b^{BL}, \quad (22b)$$

$$\mathcal{A}^{EG}(X) = b^{EG} \quad (22c)$$

$$\mathcal{A}^{IF}(X) = b^{IF} \quad (22d)$$

$$X = \begin{bmatrix} 1 & x^T \\ x & xx^T \end{bmatrix}, \quad (22e)$$

or equivalently as EQS. (23):

$$\min_X C \cdot X \quad (23a)$$

$$\text{s.t.} \quad \mathcal{A}^{BL}(X) \stackrel{y^{BL}}{=} b^{BL} \quad (23b)$$

$$\mathcal{A}^{EG}(X) \stackrel{y^{EG}}{=} b^{EG} \quad (23c)$$

$$\mathcal{A}^{IF}(X) \stackrel{y^{IF}}{=} b^{IF} \quad (23d)$$

$$X \succeq 0, \quad (23e)$$

$$\text{rank}(X) = 1, \quad (23f)$$

where x denotes a real symmetric matrix aggregating all aforementioned decision variables, $A^{BL}(X)$, $A^{EG}(X)$, and $A^{IF}(X)$ reformulate the building (BL) model constraints, the electric grid (EG) constraints, and the building-grid interface model (IF) constraints, respectively, in a semi-definite programming format, and $y^{BL}$, $y^{EG}$, and $y^{IF}$ are the respective dual variables. For example, $$\mathcal{A}^{BL}(X) = \text{vec}\{A_1^{BL} \cdot X, \ldots, A_{c_b}^{BL} \cdot X\}, \quad (24a)$$

$$\mathcal{A}^{EG}(X) = \text{vec}\{A_1^{EG} \cdot X, \ldots, A_{c_e}^{EG} \cdot X\}, \quad (24b)$$

$$\mathcal{A}^{IF}(X) = \text{vec}\{A_1^{IF} \cdot X, \ldots, A_{c_i}^{IF} \cdot X\}, \quad (24c)$$

where $c_b$, $c_e$, and $c_i$ denote the number of building, electric grid, and interface constraints, respectively. EQS. (22) and (23) represents a change from optimizing over vector spaces to optimizing over the space of symmetric matrices.

Note that EQS. (23) are nonlinear and nonconvex due to the rank condition on the matrix variable X. Embodiments of the invention may relax the rank condition on X which leads to a convex relaxation of a smart site management model according to embodiments of the invention. Embodiments of the invention may solve the ensuing model using an interior point method that exploits the sparsity structure.

II.2. Solution by Primal-Dual Interior-Point Method

The algebra of a primal-dual interior point method for an SDP relaxation of the management model according to an embodiment of the invention is outlined as follows. It has been shown that, using a primal-dual interior point method, SDP can be solved to optimality with an error bounded by a given tolerance, say $\epsilon$, in polynomial time.

A relaxed primal SDP according to an embodiment of the invention may be stated as follows:

$$\min_X C \cdot X \tag{25a}$$

$$\text{s.t. } \mathcal{A}^{BL}(X) \stackrel{y^{BL}}{=} b^{BL}, \tag{25b}$$

$$\mathcal{A}^{EG}(X) \stackrel{y^{EG}}{=} b^{EG}, \tag{25c}$$

$$\mathcal{A}^{IF}(X) \stackrel{y^{IF}}{=} b^{IF}, \tag{25d}$$

$$X \succeq 0. \tag{25e}$$

According to an embodiment of the invention, the dual of EQS. (25) is as follows:

$$\min_{y,Z} b^{BL} \cdot y^{BL} + b^{EG} \cdot y^{EG} + b^{IF} \cdot y^{IF} \tag{26a}$$

$$\text{s.t. } \tilde{\mathcal{A}}^{BL}(y^{BL}) + \tilde{\mathcal{A}}^{EG}(y^{EG}) + \tilde{\mathcal{A}}^{IF}(y^{IF}) + Z = C, \tag{26b}$$

$$Z \succeq 0. \tag{26c}$$

where $\tilde{A}^{BL}(y^{BL})$, $\tilde{A}^{EG}(y^{EG})$ and $\tilde{A}^{IF}(y^{IF})$ denotes the transpose of $A^{BL}(y^{BL})$, $A^{EG}(y^{EG})$, and $A^{IF}(y^{IF})$, respectively:

$$\tilde{\mathcal{A}}^{BL}(y) = \sum_{i=1}^{c_b} y_i A_i^{BL}, \tag{27a}$$

$$\tilde{\mathcal{A}}^{EG}(y) = \sum_{i=1}^{c_e} y_i A_i^{EG}, \tag{27b}$$

$$\tilde{\mathcal{A}}^{IF}(y) = \sum_{i=1}^{c_b} y_i A_i^{IF}, \tag{27c}$$

where $c_b$, $c_e$, and $c_i$ denote the number of building, electric grid, and interface constraints, respectively.

Given a primal-dual feasible (X, y, Z), i.e. if X and (y, Z) are feasible solutions for EQS. (25) and (26), respectively, the duality gap is:

$$C \cdot X - b^{BL} \cdot y^{BL} - b^{EG} \cdot y^{EG} - b^{IF} \cdot y^{IF} = X \cdot Z \geq 0 \tag{28}$$

where equality holds; i.e. $Z \cdot X = 0$, if and only if $XZ = 0$.

Figure 6:
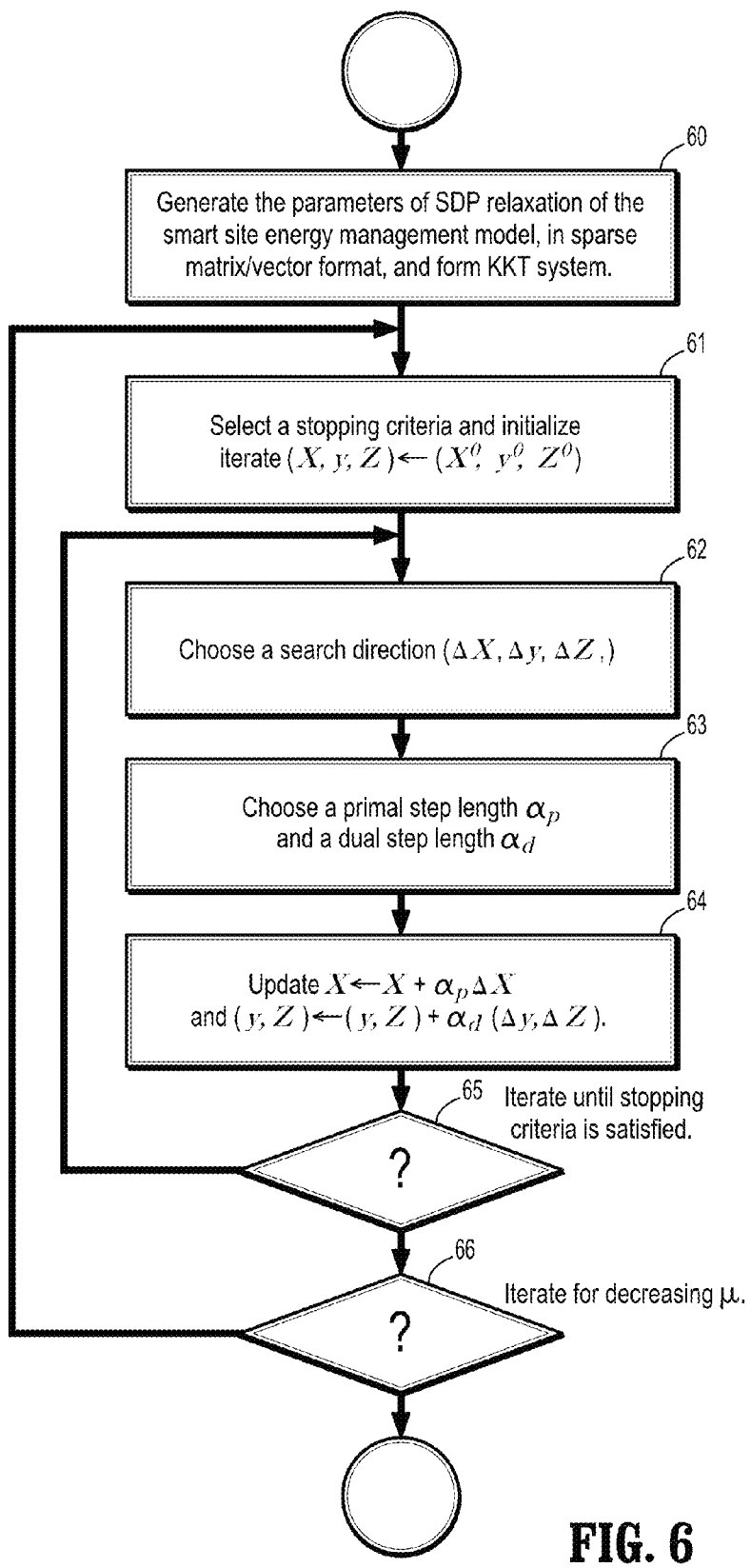
FIG. 6 is a flowchart of a method for solving an SDP relaxation of an integrated building and energy management model, according to an embodiment of the invention.

A solution approach according to an embodiment of the invention is presented in FIG. 6 and includes solving the following parameterized SDP problem for a variety of positive real values $\mu$ as $\mu$ tends to zero:

$$\min_X C \cdot X - \mu \ln(\det(X)) \tag{29a}$$

$$\text{s.t. } \mathcal{A}^{BL}(X) = b^{BL}, \tag{29b}$$

$$\mathcal{A}^{EG}(X) = b^{EG}, \tag{29c}$$

$$\mathcal{A}^{IF}(X) = b^{IF}, \tag{29d}$$

$$X \succ 0. \tag{29e}$$

where ln denote the natural logarithm. Referring now to the figure, at step 60, the optimality or Karush-Kuhn-Tucker (KKT) conditions are imposed on EQS. (29) to yield:

$$C - \mu X^{-1} - \tilde{\mathcal{A}}^{BL}(y^{BL}) - \tilde{\mathcal{A}}^{EG}(y^{EG}) - \tilde{\mathcal{A}}^{IF}(y^{IF}) = 0, \tag{30a}$$

$$\mathcal{A}^{BL}(X) - b^{BL} = 0, \tag{30b}$$

$$\mathcal{A}^{EG}(X) - b^{EG} = 0, \tag{30c}$$

$$\mathcal{A}^{IF}(X) - b^{IF} = 0, \tag{30d}$$

$$X \succ 0. \tag{30e}$$

Embodiments of the invention define $Z = \mu X^{-1}$, which implies $XZ = \mu I$, to recast the KKT conditions as follows:

$$C - Z - \tilde{\mathcal{A}}^{BL}(y^{BL}) - \tilde{\mathcal{A}}^{EG}(y^{EG}) - \tilde{\mathcal{A}}^{IF}(y^{IF}) = 0, \tag{31a}$$

$$\mathcal{A}^{BL}(X) - b^{BL} = 0, \tag{31b}$$

$$\mathcal{A}^{EG}(X) - b^{EG} = 0, \tag{31c}$$

$$\mathcal{A}^{IF}(X) - b^{IF} = 0, \tag{31d}$$

$$XZ - \mu I = 0, \tag{31e}$$

where $X \succ 0$.

A nonlinear algebraic system can be solved using any appropriate Newton-like method, i.e. any method adapted from the following generic procedure, with reference to the steps shown in FIG. 6:

1. Select a stopping criteria, and choose an initial point ($X^0$, $y^0$, $Z^0$), such that $X^0 \succ 0$ and $Z^0 \succ 0$. Set $(X, y, Z) \leftarrow (X^0, y^0, Z^0)$ (Step 61).
2. REPEAT
3. Choose a search direction $(\Delta X, \Delta y, \Delta Z)$ (Step 62).
4. Choose a primal step length $\alpha_p$ and a dual step length $\alpha_d$ such the following conditions hold: (Step 63)

$$X + \alpha_p \Delta X \succ 0. \tag{32a}$$

$$Z + \alpha_d \Delta Z \succ 0. \tag{32b}$$

5. Update the variables: (Step 64)

$$X \leftarrow X + \alpha_p \Delta X, \tag{33a}$$

$$(y, Z) \leftarrow (y, Z) + \alpha_d (\Delta y, \Delta z). \tag{33b}$$

6. UNTIL the current iterate (X, y, Z) satisfies the stopping criteria. (Step 65)

The above steps 1-6 would be repeated from step 66 for decreasing values of $Z = \mu X^{-1}$.

The search direction $(\Delta X, \Delta y, \Delta Z)$ can be determined by solving a following algebraic system according to an embodiment of the invention:

$$\Delta Z + \tilde{\mathcal{A}}^{BL}(\Delta y^{BL}) + \tilde{\mathcal{A}}^{EG}(\Delta y^{EG}) + \tilde{\mathcal{A}}^{IF}(\Delta y^{IF}) = -r^X, \tag{34a}$$

$$\mathcal{A}^{BL}(\Delta X) = -r^{BL}, \tag{34b}$$

$$\mathcal{A}^{EG}(\Delta X) = -r^{EG}, \tag{34c}$$

$$\mathcal{A}^{IF}(\Delta X) = -r^{IF}, \tag{34d}$$

$$\mathcal{H}_P((\Delta X)Z + X \Delta Z) = -r^{XZ}, \tag{34e}$$

where $$r^X = C - \Delta Z - \hat{\mathcal{A}}^{BL}(\Delta y^{BL}) - \hat{\mathcal{A}}^{EG}(\Delta y^{EG}) - \hat{\mathcal{A}}^{IF}(\Delta y^{IF}),$$ (35a)

$$r^{BL} = \mathcal{A}^{BL}(X) - b^{BL},$$ (35b)

$$r^{EG} = \mathcal{A}^{EG}(X) - b^{EG},$$ (35c)

$$r^{IF} = \mathcal{A}^{IF}(X) - b^{IF},$$ (35d)

$$r^{XZ} = \mathcal{H}_P(XZ) - \sigma \mu I$$ (35e)

$$\sigma \in [0,1]$$ (35f), and $H_P$ is a symmetrization operator which, for a non-singular matrix P, ensures that XZ is symmetric at every iterate: $H_P A = \frac{1}{2}(PAP^{-1} + (PAP^{-1})^T)$, thus $$H_P(XZ) = \frac{1}{2}(PXZP^{-1} + (PXZP^{-1})^T)$$ (36a)

$$H_P(\Delta XZ + X\Delta Z) = \frac{1}{2}(P(\Delta XZ + X\Delta Z)P^{-1} + (P(\Delta XZ + X\Delta Z)P^{-1})^T)$$ (36b)

Exemplary, non-limiting choices for P are $P = Z^{1/2}$ and $P = I$.

Iterating the above steps until convergence will yield global lower bound for the cost function.

III. System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

FIG. 5 is a block diagram of an exemplary computer system for implementing a method and system for convex relaxation of an integrated building and energy management model, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

APPENDIX

Nomenclature

The main notation used throughout the present paper is summarized below.

Two-Letter Mnemonic of Energy Resources
BL Building.
BR Branch.
CD Condenser.
CG Chiller group.
CH Chiller.
CM Building group
DA Deaeretor.
EG Electric grid (excluding buildings)
GN Generator.
GS Gas
GT Gas turbine.
HR Heat recovery steam generator
IF Building-grid interface
LD Load
ND Node.
PM Pump.
ST Steam turbine.
TE Terminal.
TS Thermal energy storage (TES).
WR Water Parameters
$\pi_{igk}^{CG}$ Chilled water supply temperature of combined stream from all chillers (K)
$\pi_{1ck}^{CD}$ Condenser i pressure 1 in Steam Loop (kPa)
$\pi_{2ck}^{CD}$ Condenser i pressure 2 in Steam Loop (kPa)
$\pi_{1ck}^{CH}$ Power consumed by chiller c condenser pumps (kW)
$\pi_{2ck}^{CH}$ Power consumed by chiller c chilled water pumps (kW)
$\pi_{3ck}^{CH}$ Power requirement by chiller c cooling tower fans (kW)
$\pi_{1mk}^{CM}$ Cost of electricity purchase from grid by building group m at time k ($/KWh)
$\pi_{2mk}^{CM}$ Electricity demand from building group m at time k (MW)
$\pi_{3mk}^{CM}$ Cooling demand from building group m at time k (kW)
$\pi_{1dk}^{DA}$ Deaerator d pressure in Steam Loop (kPa)
$\pi_{1gk}^{GS}$ Ideal gas specific heat capacity of steam (KJ/kg-K)
$\pi_{1gk}^{GT}$ Cost of fuel purchase for GT i at time k ($/kg)
$\pi_{1hk}^{HR}$ Water stream pressure loss factor in HR h at time k
$\pi_{2hk}^{HR}$ Overall effectiveness of HR h at time k
$\pi_{1sk}^{ST}$ Overall efficiency of ST s at time k
$\pi_{1tk}^{TS}$ Thermal transport delay time in discharging mode of TS t at time k(s)
$\pi_{2tk}^{TS}$ TES thermal transport delay time in charging mode(s)
$\pi_{3tk}^{TS}$ Time constant multiplier associated with TS upper layer in charging mode.
$\pi_{4tk}^{TS}$ Time constant multiplier associated with the TS upper layer in discharging mode.

$\pi_{5tk}^{TS}$ Inter-layer heat transfer coefficient of TS in discharging mode (kW/m²-K)
$\pi_{6tk}^{TS}$ Time constant multiplier associated with the TES bottom layer in discharging mode.
$\pi_{7tk}^{TS}$ Inter-layer heat transfer coefficient of TES in charging mode (kW/m²-K)
$\pi_{8tk}^{TS}$ Time constant multiplier associated with the TES bottom layer in charging mode.
$\pi_{9tk}^{TS}$ Area of TES tank (m²)
$\pi_{1wk}^{WR}$ Density of water (kg/s)
$\pi_{2wk}^{WR}$ Enthalpy of vaporization of water.
$\pi_{2wk}^{WR}$ Specific heat capacity of water (kJ/kg-K)

Decision Variables $x_{1gk}^{CG}$ Temperature of return water to chiller group g at time k (K)
$x_{2gk}^{CG}$ Net chilled water mass flow rate through chiller group g at time k (kg/s)
$x_{1ck}^{CH}$ Power requirement by chiller compressor c at time k (kW)
$x_{2ck}^{CH}$ Supply water temperature from chiller c at time k (K)
$x_{3ck}^{CH}$ Cooling provided by chiller c at time k (kW)
$x_{4ck}^{CH}$ Chilled water mass flow rate in chiller c at time k (kg/s)
$x_{1mk}^{CM}$ Chilled water flow rate through building group m at time k (kg/s)
$x_{2mk}^{CM}$ Chilled water supply temperature to building group m at time k (K)
$x_{3mk}^{CM}$ Temperature of return water from building group m at time k (K)
$x_{4ck}^{CM}$ Mass flow rate of steam used for heating building group m at time k (kg/s)
$x_{5mk}^{CM}$ Power purchase from electric grid by building group m at time k (MW)
$x_{1gk}^{GT}$ Flow rate of exhaust gas of GT g at time k (kg/s)
$x_{2gk}^{GT}$ Turbine exit temperature from GT g at time k (K)
$x_{3gk}^{GT}$ Power produced by GT g at time k (MW)
$x_{4gk}^{GT}$ Fuel consumption rate by GT g at time k (kg/s)
$x_{1hk}^{HR}$ Inlet water temperature to HR h at time k (K)
$x_{2hk}^{HR}$ Steam temperature exiting HR h at time k (K)
$x_{3hk}^{HR}$ Saturation temperature in HR h at time k.
$x_{4hk}^{HR}$ Gas temperature exiting HR h at time k (K)
$x_{5hk}^{HR}$ Steam pressure exiting HR h at time k (kPa)
$x_{6hk}^{HR}$ Saturation pressure in HR h at time k.
$x_{7hk}^{HR}$ Steam pressure entering HR h at time k (kPa).
$x_{8hk}^{HR}$ Water mass flow rate through HR h at time k (kg/s)
$x_{1pk}^{PM}$ Power consumption by pump p in steam loop at time k (kW)
$x_{1sk}^{ST}$ Power produced by ST s at time k (MW)
$x_{2sk}^{ST}$ Mass flow rate of steam used to drive ST s at time k (kg/s)
$x_{2sk}^{ST}$ Fraction of cogenerated steam used to drive ST s at time k
$x_{1tk}^{TS}$ Top layer temperature in 2-zone model of TS t at time k (K)
$x_{2tk}^{TS}$ Bottom layer temperature in 2-zone model of TS t at time k (K)
$x_{3tk}^{TS}$ Inlet stream temperature in charging mode of TS t at time k (K)
$x_{4tk}^{TS}$ Outlet stream temperature in charging mode of TS t at time k (K)
$x_{5tk}^{TS}$ Outlet stream temperature in discharging mode of TS t at time k (K)
$x_{6tk}^{TS}$ Inlet stream temperature in discharging mode of TS t at time k (K)
$x_{7tk}^{TS}$ Chilled water circulation through TS t at time k (kg/s)
$x_{8tk}^{TS}$ Outlet stream temperature in charging mode of TS t at time k, as predicted by detailed model (K)
$x_{9tk}^{TS}$ Outlet stream temperature in discharging mode of TS t at time k, as predicted by detailed model (K)

What is claimed is:

1. A computer-implemented method for optimizing a cost of electric power generation in a smart site energy management model, the method implemented by a computer comprising the steps of:
providing, to a computer system, a cost function ζ that models a smart building-grid energy system of a plurality of buildings on a site interconnected with electric power grid energy resources and constraints due to a building model, an electric grid model, and a building-grid interface model, wherein decision variables for each of the building model, the electric grid model, and the building-grid interface model are box-constrained; and
minimizing, by the computer system, said cost function subject to the building model constraints, the electric grid model constraints, and building-grid interface model constraints,
wherein the building model includes a plurality of buildings, one or more gas turbines and generators as on-site sources for electricity power, electric chillers, pumps and thermal energy storage tanks, wherein waste heat in exhaust gas from the gas turbines is used to generate steam in one or more heat recovery steam generator (HRSG) units, steam from the HRSG units drives one or more absorption chillers to generate cooling, one or more steam turbines to drive additional electricity generators, or provides heating needs for the plurality of buildings,
the electric grid includes one or more loads and is modeled as an undirected graph G=(N, E), where N and E denote sets of electric nodes and branches, respectively, wherein each branch has an origin terminal and a destination terminal, each terminal is connected to an electric node, a voltage at node $n_1$ is a complex number defined by its magnitude and angle, and a power flow at terminal $t_1$ is a complex number defined by its real and imaginary parts, and the building-grid interface model constrains a building cooling load to be satisfied by chiller operations at all times, and an electricity load to be satisfied by on-site generation and the electric grid.

2. The method of claim 1, wherein the cost function is $$\varsigma = \sum_k \sum_j [\rho_{jk}^{T_j} u_{djk}^{T_j}(x_{jk}^{T_j})]^2,$$

wherein
ρ is a vector of parameters of components of the building model and electric grid model,
$u_d$ is a basis vector of d-degree polynomials,
x is a vector of decision variables of the building model and electric grid model, wherein a dimension of ρ and $u_d(x)$ is given by $$|u_d| = \binom{|x| + d}{d},$$

j is an index over the components of the building model and electric grid model, $T_j$ denotes one of the components of the building model and electric grid model, and k is an index of time measurements of said parameters and decision variable values, and said constraints are $P^{BL}(x)=0$, $P^{EG}(x)=0$, $P^{IF}(x)=0$, and $x \geq 0$, wherein $P^{BL}(x)$, $P^{EG}(x)$, and $P^{IF}(x)$ are sets of polynomials defining the building (BL) model constraints, the electric grid (EG) model constraints, and the building-grid interface model (IF) constraints, respectively.

3. The method of claim 2, wherein the components of the building model include the electric and absorption chillers, a group of chillers, a group of the plurality of buildings, the generators, the gas turbines, the HRSG units, the pumps, the steam turbines, the thermal energy storages, and the components of the electric grid model include loads, nodes, and terminals.

4. The method of claim 2, wherein said cost function is reformulated in a semi-definite programming format as $$\min_X C \cdot X,$$
$$\text{s.t. } A^{BL}(X) = b^{BL}$$
$$A^{EG}(X) = b^{EG}$$
$$A^{IF}(X) = b^{IF}$$
$$X \succeq 0,$$
$$\operatorname{rank}(X) = 1,$$

by reformulating non-linear terms in the cost function and constraints as bilinear terms and using a matrix inner product operator on the bilinear terms, wherein C is a matrix formed of the parameters of the components of the building model and electric grid model, X is a matrix formed of the decision variables of the building model and electric grid model, $A^{BL}(x)$, $A^{EG}(X)$, and $A^{IF}(X)$ are reformulations of the building (BL) model constraints, the electric grid (EG) constraints, and the building-grid interface model (IF) constraints, respectively, in a semi-definite programming format, $b^{BL}$, $b^{EG}$, and $b^{IF}$ are constants derived from the constraints of the building model and electric grid model, and $$X = \begin{bmatrix} 1 & x^T \\ x & xx^T \end{bmatrix}.$$

5. The method of claim 4, further comprising relaxing the condition rank(X)=1, and solving a following primal semi-definite program $$\min_X C \cdot X - \mu \ln(\det(X)), \text{ wherein } \mu \text{ is a Lagrange multiplier,}$$
$$\text{subject to } A^{BL}(X) = b^{BL},$$
$$A^{EG}(X) = b^{EG},$$
$$A^{IF}(X) = b^{IF},$$
$$X \succ 0,$$

for positive real values of $\mu$ as $\mu$ approaches zero.

6. The method of claim 5, wherein solving the primal semi-definite program comprises:

imposing optimality conditions on the primal semi-definite program to derive $$C - Z - \tilde{\mathcal{A}}^{BL}(y^{BL}) - \tilde{\mathcal{A}}^{EG}(y^{EG}) - \tilde{\mathcal{A}}^{IF}(y^{IF}) = 0,$$
$$\mathcal{A}^{BL}(X) - b^{BL} = 0,$$
$$\mathcal{A}^{EG}(X) - b^{EG} = 0,$$
$$\mathcal{A}^{IF}(X) - b^{IF} = 0,$$
$$XZ - \mu I = 0,$$

wherein $Z = \mu X^{-1}$, $X \succ 0$, and $\tilde{\mathcal{A}}^{BL}(y^{BL})$, $\tilde{\mathcal{A}}^{EG}(y^{EG})$ and $\tilde{\mathcal{A}}^{IF}(y^{IF})$ are transposes of $\mathcal{A}^{BL}(y^{BL})$, $\mathcal{A}^{EG}(y^{EG})$ and $\mathcal{A}^{IF}(y^{IF})$ where $y^{BL}$, $y^{EG}$ and $y^{IF}$ are variables in a dual program of the primal semi-definite program;

initializing a solution (X, y, Z) to an initial point ($X^0$, $y^0$, $Z^0$) wherein $X^0 \succ 0$, $Z^0 \succ 0$, and y is a vector that aggregates $y^{BL}$, $y^{EG}$, and $y^{IF}$;

choosing a search direction ($\Delta X$, $\Delta y$, $\Delta Z$), wherein $\Delta X$, $\Delta y$, $\Delta Z$ represents changes in X, y, Z;

choosing a primal step length $\alpha_p$ and a dual step length $\alpha_d$ that satisfy $X + \alpha_p \Delta X \succ 0$ and $Z + \alpha_d \Delta Z \succ 0$; and updating $X \leftarrow X + \alpha_p \Delta X$ and $(y, Z) \leftarrow \alpha_d (\Delta y, \Delta Z)$.

7. The method of claim 6, further comprising repeating the steps of choosing a search direction, choosing a primal step length and a dual step length, and updating a current iterate (X, y, Z) until the current iterate satisfies a stopping condition.

8. The method of claim 6, wherein choosing a search direction comprises solving $$\Delta Z + \tilde{\mathcal{A}}^{BL}(\Delta y^{BL}) + \tilde{\mathcal{A}}^{EG}(\Delta y^{EG}) + \tilde{\mathcal{A}}^{IF}(\Delta y^{IF}) = -r^X,$$
$$\mathcal{A}^{BL}(\Delta X) = -r^{BL},$$
$$\mathcal{A}^{EG}(\Delta X) = -r^{EG},$$
$$\mathcal{A}^{IF}(\Delta X) = -r^{IF},$$
$$\mathcal{H}_P((\Delta X)Z + X \Delta Z) = -r^{XZ},$$

wherein $$r^X = C - \Delta Z - \tilde{\mathcal{A}}^{BL}(\Delta y^{BL}) - \tilde{\mathcal{A}}^{EG}(\Delta y^{EG}) - \tilde{\mathcal{A}}^{IF}(\Delta y^{IF}),$$
$$r^{BL} = \mathcal{A}^{BL}(X) - b^{BL},$$
$$r^{EG} = \mathcal{A}^{EG}(X) - b^{EG},$$
$$r^{IF} = \mathcal{A}^{IF}(X) - b^{IF},$$
$$r^{XZ} = \mathcal{H}_P(XZ) - \sigma \mu I, \text{ wherein } I \text{ is an identity matrix,}$$
$$\sigma \in [0,1],$$
$$H_P(XZ) = \frac{1}{2}(PXZP^{-1} + (PXZP^{-1})^T), \text{ and}$$
$$H_P(\Delta XZ + X \Delta Z) = \frac{1}{2}(P(\Delta XZ + X \Delta Z)P^{-1} + (P(\Delta XZ + X \Delta Z)P^{-1})^T) \text{ for a non-singular matrix } P.$$

9. A computer-implemented method for optimizing a cost of electric power generation in a smart site energy management model, the method implemented by a computer system comprising the steps of:

providing, to the computer system, a semidefinite program $$\min_X C \cdot X - \mu \ln(\det(X))$$

-continued subject to $A^{BL}(X) = b^{BL}$, $A^{EG}(X) = b^{EG}$, $A^{IF}(X) = b^{IF}$, $X \succ 0$, wherein C·X is a cost function that models a smart building-grid energy system of a plurality of buildings on a site interconnected with electric power grid energy resources wherein C is a matrix formed of parameters of components of a building model and an electric grid model, X is a matrix formed of decision variables of the building model and electric grid model, μ is a Lagrange multiplier, $A^{BL}(X)$, $A^{EG}(X)$, and $A^{IF}(X)$ are constraints due to a building (BL) model, an electric grid (EG) model, and a building-grid interface model (IF), respectively, in a semi-definite programming format, $b^{BL}$, $b^{EG}$, and $b^{IF}$ are constants derived from the constraints of the building model and electric grid model, and $$X = \begin{bmatrix} 1 & x^T \\ x & xx^T \end{bmatrix},$$

wherein a rank condition on X has been relaxed; and
solving, by the computer system, $$\min_X C \cdot X - \mu \ln(\det(X)),$$

subject to the constraints, for positive real values of μ as μ approaches zero.

10. The method of claim 9, wherein C·X is derived by reformulating non-linear terms in a function ζ and constraints $P^{BL}(x)=0$, $P^{EG}(x)=0$, $P^{IF}(x)=0$, and x≥0, as bilinear terms, using a matrix inner product operator on the bilinear terms to reformulate the bilinear terms in a semi-definite programming format,
wherein $$\varsigma = \sum_k \sum_j [\rho_{jk}^{T_j} u_{djk}^{T_j}(x_{jk}^{T_j})]^2,$$

wherein
ρ is a vector of parameters of components of the building model and electric grid model,
$u_d$ is a basis vector of d-degree polynomials,
x is a vector of decision variables of the building model and electric grid model, wherein a dimension of ρ and $u_d(x)$ is given by $$|u_d| = \binom{|x|+d}{d},$$

j is an index over the components of the building model and electric grid model,
$T_j$ denotes one of the components of the building model and electric grid model, and k is an index of time measurements of said parameters and decision variable values,
and $P^{BL}(x)$, $P^{EG}(x)$, and $P^{IF}(x)$ are sets of polynomials defining the building (BL) model constraints, the electric grid (EG) model constraints, and the building-grid interface model (IF) constraints, respectively.

11. The method of claim 9, wherein decision variables for each of the building model, the electric grid model, and the building-grid interface model are box-constrained.

12. The method of claim 9, wherein the building model includes a plurality of buildings, one or more gas turbines and generators as on-site sources for electricity power, electric chillers, pumps and thermal energy storage tanks, wherein waste heat in exhaust gas from the gas turbines is used to generate steam in one or more heat recovery steam generator (HRSG) units, steam from the HRSG units drives one or more absorption chillers to generate cooling, steam turbines to drive additional electricity generators, or provides heating needs for the plurality of buildings,
the electric grid includes one or more loads and is modeled as an undirected graph G=(N, E), where N and E denote sets of electric nodes and branches, respectively, wherein each branch has an origin terminal and a destination terminal, each terminal is connected to an electric node, a voltage at node $n_1$ is a complex number defined by its magnitude and angle, and a power flow at terminal $t_1$ is a complex number defined by its real and imaginary parts, and the building-grid interface model constrains a building cooling load to be satisfied by chiller operations at all times, and an electricity load to be satisfied by on-site generation and the electric grid.

13. The method of claim 9, wherein solving the primal semi-definite program comprises:
imposing optimality conditions on the primal semi-definite program to derive $C-Z-\tilde{\mathcal{A}}^{BL}(y^{BL})-\tilde{\mathcal{A}}^{EG}(y^{EG})-\tilde{\mathcal{A}}^{IF}(y^{IF})=0$, $\mathcal{A}^{BL}(X)-b^{BL}=0$, $\mathcal{A}^{EG}(X)-b^{EG}=0$, $\mathcal{A}^{IF}(X)-b^{IF}=0$, $XZ-\mu I=0$, wherein $Z=\mu X^{-1}$, $X \succ 0$, and $\tilde{A}^{BL}(y^{BL})$, $\tilde{A}^{EG}(y^{EG})$ and $\tilde{A}^{IF}(y^{IF})$ are transposes of $A^{BL}(y^{BL})$, $A^{EG}(y^{EG})$ and $A^{IF}(y^{IF})$ where $y^{BL}$, $y^{EG}$ and $y^{IF}$ are variables in a dual program of the primal semi-definite program;
initializing a solution (X, y, Z) to an initial point ($X^0$, $y^0$, $Z^0$) wherein $X^0 \succ 0$, $Z^0 \succ 0$, and y is a vector that aggregates $y^{BL}$, $y^{EG}$, and $y^{IF}$;
choosing a search direction (ΔX, Δy, ΔZ), wherein ΔX, Δy, ΔZ represents changes in X, y, Z;
choosing a primal step length $\alpha_p$ and a dual step length $\alpha_d$ that satisfy $X+\alpha_p \Delta X \succ 0$ and $Z+\alpha_d \Delta Z \succ 0$; and
updating $X \leftarrow X+\alpha_p \Delta X$ and $(y, Z) \leftarrow \alpha_d(\Delta y, \Delta Z)$; and
repeating the steps of choosing a search direction, choosing a primal step length and a dual step length, and updating a current iterate (X, y, Z) until the current iterate satisfies a stopping condition.

14. The method of claim 13, wherein choosing a search direction comprises solving $\Delta Z+\tilde{\mathcal{A}}^{BL}(\Delta y^{BL})+\tilde{\mathcal{A}}^{EG}(\Delta y^{EG})+\tilde{\mathcal{A}}^{IF}(\Delta y^{IF})=-r^X$, $\mathcal{A}^{BL}(\Delta X)=-r^{BL}$, $\mathcal{A}^{EG}(\Delta X)=-r^{EG}$, $\mathcal{A}^{IF}(\Delta X) = -r^{IF}$, $\mathcal{H}_P((\Delta X)Z + X\Delta Z) = -r^{XZ}$, wherein $r^X = C - \Delta Z - \tilde{\mathcal{A}}^{BL}(\Delta y^{BL}) - \tilde{\mathcal{A}}^{EG}(\Delta y^{EG}) - \tilde{\mathcal{A}}^{IF}(\Delta y^{IF})$, $r^{BL} = \mathcal{A}^{BL}(X) - b^{BL}$, $r^{EG} = \mathcal{A}^{EG}(X) - b^{EG}$, $r^{IF} = \mathcal{A}^{IF}(X) - b^{IF}$, $r^{XZ} = \mathcal{H}_P(XZ) - \sigma \mu I$, wherein $I$ is an identity matrix, $\sigma \in [0,1]$, $H_P(XZ) = \frac{1}{2}(PXZP^{-1} + (PXZP^{-1})^T)$, and $H_P(\Delta XZ + X\Delta Z) = \frac{1}{2}(P(\Delta XZ + X\Delta Z)P^{-1} + (P(\Delta XZ + X\Delta Z)P^{-1})^T)$ for a non-singular matrix $P$.

15. A non-transitory program storage device readable by a computer, tangibly embodying a program of instructions executed by the computer to perform the method steps for optimizing a cost of electric power generation in a smart site energy management model, comprising the steps of:

providing a cost function $\zeta$ that models a smart building-grid energy system of a plurality of buildings on a site interconnected with electric power grid energy resources and constraints due to a building model, an electric grid model, and a building-grid interface model, wherein decision variables for each of the building model, the electric grid model, and the building-grid interface model are box-constrained; and minimizing said cost function subject to the building model constraints, the electric grid model constraints, and building-grid interface model constraints, wherein the building model includes a plurality of buildings, one or more gas turbines and generators as on-site sources for electricity power, electric chillers, pumps and thermal energy storage tanks, wherein waste heat in exhaust gas from the gas turbines is used to generate steam in one or more heat recovery steam generator (HRSG) units, steam from the HRSG units drives one or more absorption chillers to generate cooling, one or more steam turbines to drive additional electricity generators, or provides heating needs for the plurality of buildings, the electric grid includes one or more loads and is modeled as an undirected graph $G = (N, E)$, where $N$ and $E$ denote sets of electric nodes and branches, respectively, wherein each branch has an origin terminal and a destination terminal, each terminal is connected to an electric node, a voltage at node $n_1$ is a complex number defined by its magnitude and angle, and a power flow at terminal $t_1$ is a complex number defined by its real and imaginary parts, and the building-grid interface model constrains a building cooling load to be satisfied by chiller operations at all times, and an electricity load to be satisfied by on-site generation and the electric grid.

16. The computer readable program storage device of claim 15, wherein the cost function is $$\zeta = \sum_k \sum_j \left[ \rho_{jk}^{T_j} u_{djk}^{T_j}(x_{jk}^{T_j}) \right]^2,$$

wherein $\rho$ is a vector of parameters of components of the building model and electric grid model, $u_d$ is a basis vector of $d$-degree polynomials, $x$ is a vector of decision variables of the building model and electric grid model, wherein a dimension of $\rho$ and $u_d(x)$ is given by $$|u_d| = \binom{|x| + d}{d},$$

$j$ is an index over the components of the building model and electric grid model, $T_j$ denotes one of the components of the building model and electric grid model, and $k$ is an index of time measurements of said parameters and decision variable values, and said constraints are $P^{BL}(x) = 0$, $P^{EG}(x) = 0$, $P^{IF}(x) = 0$, and $x \geq 0$, wherein $P^{BL}(x)$, $P^{EG}(x)$, and $P^{IF}(x)$ are sets of polynomials defining the building (BL) model constraints, the electric grid (EG) model constraints, and the building-grid interface model (IF) constraints, respectively.

17. The computer readable program storage device of claim 16, wherein the components of the building model include the electric and absorption chillers, a group of chillers, a group of the plurality of buildings, the generators, the gas turbines, the HRSG units, the pumps, the steam turbines, the thermal energy storages, and the components of the electric grid model include loads, nodes, and terminals.

18. The computer readable program storage device of claim 16, wherein said cost function is reformulated in a semi-definite programming format as $$\min_X C \cdot X,$$

$$\text{s.t. } A^{BL}(X) = b^{BL}$$

$$A^{EG}(X) = b^{EG}$$

$$A^{IF}(X) = b^{IF}$$

$$X \succeq 0,$$

$$\text{rank}(X) = 1,$$

by reformulating non-linear terms in the cost function and constraints as bilinear terms and using a matrix inner product operator on the bilinear terms, wherein $C$ is a matrix formed of the parameters of the components of the building model and electric grid model, $X$ is a matrix formed of the decision variables of the building model and electric grid model, $A^{BL}(X), A^{EG}(X),$ and $A^{IF}(X)$ are reformulations of the building (BL) model constraints, the electric grid (EG) constraints, and the building-grid interface model (IF) constraints, respectively, in a semi-definite programming format, $b^{BL}, b^{EG},$ and $b^{IF}$ are constants derived from the constraints of the building model and electric grid model, and $$X = \begin{bmatrix} 1 & x^T \\ x & xx^T \end{bmatrix}.$$

19. The computer readable program storage device of claim 18, the method further comprising relaxing the condition rank(X)=1, and solving a following primal semi-definite program $$\min_X C \cdot X - \mu \ln(\det(X)), \text{ wherein } \mu \text{ is a Lagrange multiplier,}$$

subject to $A^{BL}(X) = b^{BL}$, $A^{EG}(X) = b^{EG}$, $A^{IF}(X) = b^{IF}$, $X \succ 0$, for positive real values of $\mu$ as $\mu$ approaches zero.

20. The computer readable program storage device of claim 19, wherein solving the primal semi-definite program comprises:
  imposing optimality conditions on the primal semi-definite program to derive
  $C - Z - \tilde{\mathcal{A}}^{BL}(y^{BL}) - \tilde{\mathcal{A}}^{EG}(y^{EG}) - \tilde{\mathcal{A}}^{IF}(y^{IF}) = 0$,
  $\mathcal{A}^{BL}(X) - b^{BL} = 0$,
  $\mathcal{A}^{EG}(X) - b^{EG} = 0$,
  $\mathcal{A}^{IF}(X) - b^{IF} = 0$,
  $XZ - \mu I = 0$, wherein $Z = \mu X^{-1}$, $X \succ 0$, and $\tilde{A}^{BL}(y^{BL})$, $\tilde{A}^{EG}(y^{EG})$ and $\tilde{A}^{IF}(y^{IF})$ are transposes of $A^{BL}(y^{BL})$, $A^{EG}(y^{EG})$ and $A^{IF}(y^{IF})$ where $y^{BL}$, $y^{EQ}$ and $y^{IF}$ are variables in a dual program of the primal semi-definite program;
  initializing a solution (X, y, Z) to an initial point ($X^0$, $y^0$, $Z^0$) wherein $X^0 \succ 0$, $Z^0 \succ 0$, and y is a vector that aggregates $y^{BL}$, $y^{EQ}$, and $y^{IF}$;
  choosing a search direction ($\Delta X$, $\Delta y$, $\Delta Z$), wherein $\Delta X$, $\Delta y$, $\Delta Z$ represents changes in X, y, Z;
  choosing a primal step length $\alpha_p$ and a dual step length $\alpha_d$ that satisfy $X + \alpha_p \Delta X \succ 0$ and $Z + \alpha_d \Delta Z \succ 0$; and
  updating $X \leftarrow X + \alpha_p \Delta X$ and $(y, Z) \leftarrow \alpha_d (\Delta y, \Delta Z)$.

21. The computer readable program storage device of claim 20, the method further comprising repeating the steps of choosing a search direction, choosing a primal step length and a dual step length, and updating a current iterate (X, y, Z) until the current iterate satisfies a stopping condition.

22. The computer readable program storage device of claim 20, wherein choosing a search direction comprises solving $\Delta Z + \tilde{\mathcal{A}}^{BL}(\Delta y^{BL}) + \tilde{\mathcal{A}}^{EG}(\Delta y^{EG}) + \tilde{\mathcal{A}}^{IF}(\Delta y^{IF}) = -r^X$, $\mathcal{A}^{BL}(\Delta X) = -r^{BL}$, $\mathcal{A}^{EG}(\Delta X) = -r^{EG}$, $\mathcal{A}^{IF}(\Delta X) = -r^{IF}$, $\mathcal{H}_P((\Delta X)Z + X \Delta Z) = -r^{XZ}$, wherein $r^X = C - \Delta Z - \tilde{\mathcal{A}}^{BL}(\Delta y^{BL}) - \tilde{\mathcal{A}}^{EG}(\Delta y^{EG}) - \tilde{\mathcal{A}}^{IF}(\Delta y^{IF})$, $r^{BL} = \mathcal{A}^{BL}(X) - b^{BL}$, $r^{EG} = \mathcal{A}^{EG}(X) - b^{EG}$, $r^{IF} = \mathcal{A}^{IF}(X) - b^{IF}$, $r^{XZ} = \mathcal{H}_P(XZ) - \sigma \mu I$, wherein $I$ is an identity matrix, $\sigma \in [0,1]$, $H_P(XZ) = \frac{1}{2}(PXZP^{-1} + (PXZP^{-1})^T)$, and $H_P(\Delta XZ + X\Delta Z) = \frac{1}{2}(P(\Delta XZ + X\Delta Z)P^{-1} + (P(\Delta XZ + X\Delta Z)P^{-1})^T)$ for a non-singular matrix $P$.

* * * * *